(12) United States Patent
Woods

(10) Patent No.: US 9,167,196 B2
(45) Date of Patent: Oct. 20, 2015

(54) SYSTEMS AND METHODS FOR TRIMMING RECORDED CONTENT USING A MEDIA GUIDANCE APPLICATION

(75) Inventor: Thomas Steven Woods, Arlington Heights, IL (US)

(73) Assignee: Rovi Guides, Inc., Santa Clara, CA (US)

( * ) Notice: Subject to any disclaimer, the term of this patent is extended or adjusted under 35 U.S.C. 154(b) by 186 days.

(21) Appl. No.: 12/782,944

(22) Filed: May 19, 2010

(65) Prior Publication Data

US 2011/0286719 A1 Nov. 24, 2011

(51) Int. Cl.
*H04N 5/761* (2006.01)
*H04N 5/76* (2006.01)
*H04N 21/458* (2011.01)
*H04N 21/472* (2011.01)

(52) U.S. Cl.
CPC ............. *H04N 5/76* (2013.01); *H04N 21/4583* (2013.01); *H04N 21/47214* (2013.01)

(58) Field of Classification Search
CPC H04N 5/76; H04N 21/4583; H04N 21/47214
USPC .................................................. 386/292, 293
See application file for complete search history.

(56) References Cited

U.S. PATENT DOCUMENTS

| | | | |
|---|---|---|---|
| 4,751,578 A | 6/1988 | Reiter | |
| 4,761,684 A | 8/1988 | Clark et al. | |
| 4,787,063 A | 11/1988 | Muguet | |
| 4,908,707 A | 3/1990 | Kinghorn | |
| 5,036,314 A | 7/1991 | Barillari et al. | |
| 5,089,885 A | 2/1992 | Clark | |
| 5,113,259 A | 5/1992 | Romesburg et al. | |
| 5,132,992 A | 7/1992 | Yurt et al. | |
| 5,155,591 A | 10/1992 | Wachob | |
| 5,223,924 A | 6/1993 | Strubbe et al. | |
| 5,233,423 A | 8/1993 | Jernigan et al. | |
| 5,253,066 A | 10/1993 | Vogel | |
| 5,335,277 A | 8/1994 | Harvey et al. | |
| 5,353,121 A | 10/1994 | Young et al. | |
| 5,359,367 A | 10/1994 | Stockill | |
| 5,382,983 A | 1/1995 | Kwoh et al. | |

(Continued)

FOREIGN PATENT DOCUMENTS

| | | |
|---|---|---|
| DE | 31 51 492 | 7/1983 |
| DE | 195 31 121 | 2/1997 |

(Continued)

OTHER PUBLICATIONS

International Search Report and Written Opinion dated Jul. 14, 2011 for International Application PCT/US2011/032225.

(Continued)

*Primary Examiner* — William Tran
(74) *Attorney, Agent, or Firm* — Ropes & Gray LLP

(57) ABSTRACT

Systems and methods for trimming recorded content or segments using a media guidance application are provided. A first program scheduled for recording during one timeslot. A determination is made that the first program will run beyond the scheduled broadcast time. The first program may be rescheduled for recording during a second larger timeslot that overlaps with the scheduled broadcast time of a second program. Content provided by the program source may be recorded during the second timeslot. The recorded content may be trimmed to remove portions of the recorded content that correspond to the second program.

18 Claims, 13 Drawing Sheets

(56) References Cited

U.S. PATENT DOCUMENTS

| | | |
|---|---|---|
| 5,410,326 A | 4/1995 | Goldstein |
| 5,414,756 A | 5/1995 | Levine |
| 5,455,570 A | 10/1995 | Cook et al. |
| 5,465,113 A | 11/1995 | Gilboy |
| 5,469,206 A | 11/1995 | Strubbe et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,502,504 A | 3/1996 | Marshall et al. |
| 5,509,908 A | 4/1996 | Hillstead et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,534,911 A | 7/1996 | Levitan |
| 5,550,576 A | 8/1996 | Klosterman |
| 5,557,338 A | 9/1996 | Maze et al. |
| 5,559,548 A | 9/1996 | Davis et al. |
| 5,559,549 A | 9/1996 | Hendricks et al. |
| 5,559,550 A | 9/1996 | Mankovitz |
| 5,570,295 A | 10/1996 | Isenberg et al. |
| 5,572,442 A | 11/1996 | Schulhof et al. |
| 5,579,239 A | 11/1996 | Freeman et al. |
| 5,583,560 A | 12/1996 | Florin et al. |
| 5,585,838 A | 12/1996 | Lawler et al. |
| 5,585,865 A | 12/1996 | Amano et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,606,374 A | 2/1997 | Bertram |
| 5,617,526 A | 4/1997 | Oran et al. |
| 5,619,249 A | 4/1997 | Billock et al. |
| 5,621,456 A | 4/1997 | Florin et al. |
| 5,623,613 A | 4/1997 | Rowe et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,640,484 A | 6/1997 | Mankovitz |
| 5,654,748 A | 8/1997 | Matthews et al. |
| 5,657,072 A | 8/1997 | Aristides et al. |
| 5,666,293 A | 9/1997 | Metz et al. |
| 5,673,089 A | 9/1997 | Yuen et al. |
| 5,675,390 A | 10/1997 | Schindler et al. |
| 5,682,206 A | 10/1997 | Wehmeyer et al. |
| 5,692,214 A | 11/1997 | Levine |
| 5,694,163 A | 12/1997 | Harrison |
| 5,699,107 A | 12/1997 | Lawler et al. |
| 5,710,601 A | 1/1998 | Marshall et al. |
| 5,734,853 A | 3/1998 | Hendricks et al. |
| 5,734,893 A | 3/1998 | Li et al. |
| 5,748,191 A | 5/1998 | Rozak et al. |
| 5,748,716 A | 5/1998 | Levine |
| 5,758,257 A | 5/1998 | Herz et al. |
| 5,758,259 A | 5/1998 | Lawler |
| 5,781,246 A | 7/1998 | Alten et al. |
| 5,787,259 A | 7/1998 | Haroun et al. |
| 5,788,507 A | 8/1998 | Redford et al. |
| 5,790,202 A | 8/1998 | Kummer et al. |
| 5,793,964 A | 8/1998 | Rogers et al. |
| 5,798,785 A | 8/1998 | Hendricks et al. |
| 5,812,931 A | 9/1998 | Yuen |
| 5,828,420 A | 10/1998 | Marshall et al. |
| 5,844,620 A | 12/1998 | Coleman et al. |
| 5,850,218 A | 12/1998 | LaJoie et al. |
| 5,858,866 A | 1/1999 | Berry et al. |
| 5,867,233 A | 2/1999 | Tanaka |
| 5,880,768 A | 3/1999 | Lemmons et al. |
| 5,886,732 A | 3/1999 | Humpleman |
| 5,886,746 A | 3/1999 | Yuen et al. |
| 5,907,323 A | 5/1999 | Lawler et al. |
| 5,914,746 A | 6/1999 | Matthews, III et al. |
| 5,977,964 A | 11/1999 | Williams et al. |
| 5,986,650 A | 11/1999 | Ellis et al. |
| 5,988,078 A | 11/1999 | Levine |
| 6,002,394 A | 12/1999 | Schein et al. |
| 6,014,184 A | 1/2000 | Knee et al. |
| 6,016,141 A | 1/2000 | Knudson et al. |
| 6,097,441 A | 8/2000 | Allport |
| 6,104,334 A | 8/2000 | Allport |
| 6,130,726 A | 10/2000 | Darbee et al. |
| 6,177,931 B1 | 1/2001 | Alexander et al. |
| 6,208,384 B1 | 3/2001 | Schultheiss |
| 6,226,444 B1 | 5/2001 | Goldschmidt et al. |
| 6,226,618 B1 | 5/2001 | Downs et al. |
| 6,233,734 B1 | 5/2001 | Macrae et al. |
| 6,239,794 B1 | 5/2001 | Yuen et al. |
| 6,263,501 B1 | 7/2001 | Schein et al. |
| 6,268,849 B1 | 7/2001 | Boyer et al. |
| 6,310,886 B1 | 10/2001 | Barton |
| 6,324,338 B1 | 11/2001 | Wood et al. |
| 6,331,877 B1 | 12/2001 | Bennington et al. |
| 6,354,378 B1 | 3/2002 | Patel |
| 6,357,043 B1 | 3/2002 | Ellis et al. |
| 6,418,556 B1 | 7/2002 | Bennington et al. |
| 6,463,585 B1 | 10/2002 | Hendricks et al. |
| 6,536,041 B1 | 3/2003 | Knudson et al. |
| 6,564,378 B1 | 5/2003 | Satterfield |
| 6,611,654 B1 | 8/2003 | Shteyn |
| 6,614,987 B1 | 9/2003 | Ismail et al. |
| 6,651,253 B2 | 11/2003 | Dudkiewicz et al. |
| 6,756,997 B1 | 6/2004 | Ward, III et al. |
| 6,760,412 B1 | 7/2004 | Loucks |
| 6,760,537 B2 | 7/2004 | Mankovitz |
| 6,760,538 B1 * | 7/2004 | Bumgardner et al. ........ 386/291 |
| 6,813,775 B1 | 11/2004 | Finseth et al. |
| 6,813,777 B1 | 11/2004 | Weinberger et al. |
| 6,837,789 B2 | 1/2005 | Garahi et al. |
| 6,868,225 B1 | 3/2005 | Brown et al. |
| 6,897,904 B2 | 5/2005 | Potrebic et al. |
| 6,950,624 B2 | 9/2005 | Kim et al. |
| 7,003,791 B2 | 2/2006 | Mizutani |
| 7,013,478 B1 | 3/2006 | Hendricks et al. |
| 7,020,704 B1 | 3/2006 | Lipscomb et al. |
| 7,055,166 B1 | 5/2006 | Logan et al. |
| 7,088,952 B1 | 8/2006 | Saito et al. |
| 7,165,098 B1 | 1/2007 | Boyer et al. |
| 7,206,892 B2 | 4/2007 | Kim et al. |
| 7,213,089 B2 | 5/2007 | Hatakenaka |
| 7,224,889 B2 | 5/2007 | Takasu et al. |
| 7,268,833 B2 | 9/2007 | Park et al. |
| 7,296,284 B1 | 11/2007 | Price et al. |
| 7,386,871 B1 | 6/2008 | Knudson et al. |
| 7,458,093 B2 | 11/2008 | Dukes et al. |
| 7,603,685 B2 | 10/2009 | Knudson et al. |
| 7,689,556 B2 | 3/2010 | Garg et al. |
| 7,783,632 B2 | 8/2010 | Richardson et al. |
| 2002/0054068 A1 * | 5/2002 | Ellis et al. .................. 345/716 |
| 2002/0056087 A1 | 5/2002 | Berezowski et al. |
| 2002/0056119 A1 | 5/2002 | Moynihan |
| 2002/0059610 A1 | 5/2002 | Ellis |
| 2002/0075402 A1 | 6/2002 | Robson et al. |
| 2002/0078453 A1 | 6/2002 | Kuo |
| 2002/0090203 A1 | 7/2002 | Mankovitz |
| 2002/0157099 A1 | 10/2002 | Schrader et al. |
| 2002/0165770 A1 | 11/2002 | Khoo et al. |
| 2002/0174430 A1 | 11/2002 | Ellis et al. |
| 2002/0194586 A1 | 12/2002 | Gutta et al. |
| 2002/0194600 A1 | 12/2002 | Ellis et al. |
| 2003/0066085 A1 | 4/2003 | Boyer et al. |
| 2003/0072559 A1 * | 4/2003 | Van Haver ................... 386/83 |
| 2003/0093803 A1 | 5/2003 | Ishikawa et al. |
| 2003/0110499 A1 | 6/2003 | Knudson et al. |
| 2003/0149621 A1 | 8/2003 | Shteyn |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |

(56) References Cited

U.S. PATENT DOCUMENTS

| | | | |
|---|---|---|---|
| 2004/0064835 A1 | 4/2004 | Bellwood et al. | |
| 2004/0103434 A1 | 5/2004 | Ellis | |
| 2004/0117831 A1 | 6/2004 | Ellis et al. | |
| 2004/0177370 A1 | 9/2004 | Dudkiewicz | |
| 2004/0210926 A1 | 10/2004 | Francis et al. | |
| 2004/0210932 A1 | 10/2004 | Mori et al. | |
| 2005/0028208 A1 | 2/2005 | Ellis et al. | |
| 2005/0120373 A1 | 6/2005 | Thomas et al. | |
| 2005/0160461 A1* | 7/2005 | Baumgartner et al. | 725/52 |
| 2005/0204388 A1 | 9/2005 | Knudson et al. | |
| 2005/0251827 A1 | 11/2005 | Ellis et al. | |
| 2005/0259963 A1 | 11/2005 | Sano et al. | |
| 2006/0026635 A1 | 2/2006 | Potrebic et al. | |
| 2006/0026665 A1 | 2/2006 | Rodriguez et al. | |
| 2006/0031883 A1 | 2/2006 | Ellis et al. | |
| 2006/0053449 A1 | 3/2006 | Gutta | |
| 2006/0064721 A1* | 3/2006 | Del Val et al. | 725/41 |
| 2006/0218573 A1 | 9/2006 | Proebstel | |
| 2006/0218604 A1 | 9/2006 | Riedl et al. | |
| 2006/0222327 A1* | 10/2006 | Abe et al. | 386/83 |
| 2006/0253874 A1 | 11/2006 | Stark et al. | |
| 2006/0294574 A1 | 12/2006 | Cha | |
| 2007/0033607 A1 | 2/2007 | Bryan | |
| 2007/0055989 A1 | 3/2007 | Shanks et al. | |
| 2007/0074245 A1 | 3/2007 | Nyako et al. | |
| 2007/0089132 A1 | 4/2007 | Qureshey et al. | |
| 2007/0130089 A1 | 6/2007 | Chiu | |
| 2007/0162850 A1 | 7/2007 | Adler et al. | |
| 2007/0186240 A1 | 8/2007 | Ward et al. | |
| 2008/0046930 A1 | 2/2008 | Smith et al. | |
| 2008/0074546 A1 | 3/2008 | Almoumen | |
| 2008/0184294 A1 | 7/2008 | Lemmons et al. | |
| 2010/0107194 A1 | 4/2010 | McKissick et al. | |
| 2011/0211812 A1* | 9/2011 | Tzoukermann et al. | 386/250 |

FOREIGN PATENT DOCUMENTS

| | | | |
|---|---|---|---|
| DE | 197 40 079 | | 3/1999 |
| EP | 0 774 853 | | 5/1997 |
| EP | 0 793 225 | | 9/1997 |
| EP | 0 805 594 | | 11/1997 |
| EP | 1 363 452 | | 11/2003 |
| GB | 2265792 | | 10/1993 |
| JP | 03-022770 | | 1/1991 |
| JP | 08-56352 | | 2/1996 |
| JP | 09-102827 | | 4/1997 |
| JP | 2006270233 | A * | 10/2006 |
| WO | WO-87/03766 | | 6/1987 |
| WO | WO-89/03085 | | 4/1989 |
| WO | WO-94/14282 | | 6/1994 |
| WO | WO-95/01056 | | 1/1995 |
| WO | WO-95/01059 | | 1/1995 |
| WO | WO-95/10910 | | 4/1995 |
| WO | WO-95/28055 | | 10/1995 |
| WO | WO-95/32585 | | 11/1995 |
| WO | WO-96/07270 | | 3/1996 |
| WO | WO-96/13932 | | 5/1996 |
| WO | WO-96/20555 | | 7/1996 |
| WO | WO-97/13368 | | 4/1997 |
| WO | WO-97/31480 | | 8/1997 |
| WO | WO-97/36422 | | 10/1997 |
| WO | WO-97/47106 | | 12/1997 |
| WO | WO-97/47143 | | 12/1997 |
| WO | WO-97/49237 | | 12/1997 |
| WO | WO-97/50251 | | 12/1997 |
| WO | WO-98/10589 | | 3/1998 |
| WO | WO-98/16062 | | 4/1998 |
| WO | WO-98/17064 | | 4/1998 |
| WO | WO-98/26584 | | 6/1998 |
| WO | WO-99/14947 | | 3/1999 |
| WO | WO-99/30491 | | 6/1999 |
| WO | WO-00/33576 | | 6/2000 |
| WO | WO-01/91458 | | 11/2001 |
| WO | WO 2007/036891 | | 4/2007 |
| WO | WO 2009/067670 | | 5/2009 |

OTHER PUBLICATIONS

"Honey, is there anything good on the remote tonight?", advertisement from Multichannel News, Broadband Week Section, p. 168, Nov. 30, 1998.

"How Evolve Works," from the Internet at http://www.evolveproducts.com/network.html, printed on Dec. 28, 1998.

"Jini Architecture Overview," by Jim Waldo, from the Internet at http://Java.sun.com/products/jini/whitepapers/architectureoverview.pdf/ pinted on Jan. 25, 1999. The document bears a copyright date of 1998.

"Sun's Next Steps in Digital Set-Tops," article in Cablevision, p. 56, Nov. 16, 1998.

"The Evolve EZ Guide. The Remote Control," from the Internet at http://www.evolveproducts.com/display2.html, printed on Dec. 28, 1998.

"Using Starsight 2," published before Apr. 19, 1995.

"What is Jini?", from the Internet at http://java.sun.com/products/jini/whitepapers/whatsjini.pdf, printed on Jan. 25, 1999.

"Why Jini Now?", from the internet at http://java.sun.com/products/jini/whitepapers/whyjininow.pdf, printed on Jan. 25, 1999. The document bears a copyright date of 1998.

Curt Rogers, "Telcos vs. Cable TV: The Global View," Data Communications, No. 13, New York, pp. 75, 76, 78 and 80, Sep. 1995.

Index Systems Inc., "Gemstar Service Object Model," Data Format Specification, Ver. 2.0.4, pp. 58-59, Dec. 20, 2002.

Jaidev, "EXSLT—A Wired and Wireless Case Study," http://csharpcomputing.com/XMLTutorial/Lession15.htm., Oct. 14, 2005. Papers Delivered (Part1), 61st National Conference, Information Processing Society of Japan, Oct. 3-5, 2000.

Pogue, D., "State of the Art: for TiVo and Replay, New Reach," N.Y. Times, May 29, 2003.

Randerson, J., "Let Software Catch the Game for You," New Scientist, Jul. 3, 2004.

Von Andreas Neumann, "WDR Online Aufbau Und Perspektiven Automatisierter Online-Dienste Im WDR," Rundfunktechnische Mitteilungen, vol. 41, pp. 56-66, Jun. 1997.

Von Gerhard Eitz, "Zukunftige Informations—Und Datenangebote Beim Digitalen Fernsehen—EPG Und "Lesezeichen"," Rundfunktechnische Mitteilungen, vol. 41, pp. 76-72, Apr. 30, 1997.

* cited by examiner

FIG. 1

SYSTEMS AND METHODS FOR TRIMMING RECORDED CONTENT USING A MEDIA GUIDANCE APPLICATION

BACKGROUND OF THE INVENTION

Typically television programs or other media may begin after their corresponding scheduled broadcast times when, for example, a real-time event, such as a sporting event, runs late (i.e., beyond the scheduled broadcast time). Users recording the sporting event, that is running later than the scheduled time (e.g., as a result of overtime in a sporting event), may experience an early cut-off in the recording of that event. Furthermore, the sporting event that is running past its scheduled end time may be negatively impact a scheduled recording of an adjacent program, for example, because the scheduled recording timeslot of the adjacent program may not align with the actual start/end times of the adjacent program.

One approach has been to allow users to specify padding to account for such variation in start times and end times when recording programs. This approach is deficient, however, in that the user is burdened with playing back segments of adjacent programs recorded as a result of the padding when attempting to access the recorded program. In addition, users that fail to provide the right amount of padding may cause either waste recording time (and thereby waste of storage space) due to over-padding or a cut-off in the desired recording due to under-padding.

SUMMARY OF THE INVENTION

In view of the foregoing, systems and methods for trimming recorded content or segments using a media guidance application are provided. In particular, a first program scheduled for recording during one timeslot may be rescheduled for recording during a second larger timeslot that overlaps with the scheduled broadcast time of a second program when a program is determined to run beyond its scheduled broadcast time. The content recorded during the second timeslot may be trimmed to remove portions of the recorded content that correspond to the second program.

In some embodiments, a user may select a first program for recording during a first timeslot. The first timeslot may correspond to the predetermined scheduled broadcast time associated with the first program. The media guidance application may determine that the first program will run beyond the scheduled broadcast time. In particular, the first program may be a live sporting event which may go into overtime or extra innings causing the program to end later than anticipated (e.g., after the end time of the predetermined scheduled broadcast time).

In some implementations, the first program may be a program that follows a second program and is provided by the same program source as the second program. The second program may be a live sporting event that ends later than expected (e.g., because of overtime or extra innings). Accordingly, since the second program ran beyond the scheduled broadcast time, the first program may be shifted in time to start and end later than anticipated beyond the scheduled broadcast time of the first program.

In some embodiments, the media guidance application may receive updated schedule information from a plurality of external data sources to determine whether the first program or the second program are running beyond a previously scheduled broadcast time. In particular, the media guidance application may query or poll a website on the Internet to determine whether a live sporting event is scheduled to end at the anticipated scheduled broadcast time and/or whether the live sporting event will go into overtime and beyond the anticipated scheduled broadcast time. In some implementations, the media guidance application may monitor the live broadcast of the first or second program to determine whether the program will run beyond the scheduled broadcast time. In particular, the media guidance application may compare the total time remaining in the live sporting event with the current time and/or the scheduled end time to determine whether the live sporting event has enough time to end at the scheduled end time.

In some embodiments, the media guidance application may reschedule the first program for recording during a second timeslot that is longer in time than the first timeslot by a predetermined time period. In particular, the media guidance application may extend the recording time (e.g., by 30 minutes) of the first program to ensure that the entirety of the first program is recorded even though the first program will be broadcast beyond the scheduled broadcast time. In some implementations, the second timeslot may overlap with the scheduled broadcast time of a second program that is adjacent to the first program. In particular, the extension period added to the first timeslot may cause content to be recorded from the broadcast source that corresponds to the first program and a program that precedes and/or follows the first program.

In some embodiments, after the content is recorded from the program source during the second timeslot, the recorded content may be trimmed to remove portions that correspond to one or more programs that are not the first program. In particular, the media guidance application may receive updated schedule information for the first program after the first program is broadcast. The updated schedule information may indicate the actual start and end times of the first program. The media guidance application may compare the actual start time and/or end time of the first program with the start time and/or end time of the second timeslot to automatically trim the recorded content.

In some implementations, when the start time of the second timeslot is later than the actual start time of the first program, the media guidance application may automatically trim the recorded content to remove portions of the recorded content that precede the actual start time of the first program. The removed portions may correspond to a second program that is adjacent to and precedes the first program. In some implementations, when the end time of the second timeslot is earlier than the actual end time of the first program, the media guidance application may automatically trim the recorded content to remove portions of the recorded content that follow the actual end time of the first program. The removed portions may correspond to a third program that is adjacent to and follows the first program.

The trimmed recorded content provides the user with exclusive access to only the first program that the user selected for recording. In particular, the user may playback or access the recorded content from start to finish to view the first program without any portions of adjacent programs that were provided by the same program source of the first program being played back.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 1 and 2 show illustrative display screens that may be used to provide media guidance application listings in accordance with an embodiment of the invention;

DETAILED DESCRIPTION OF EMBODIMENTS

Figure 2:
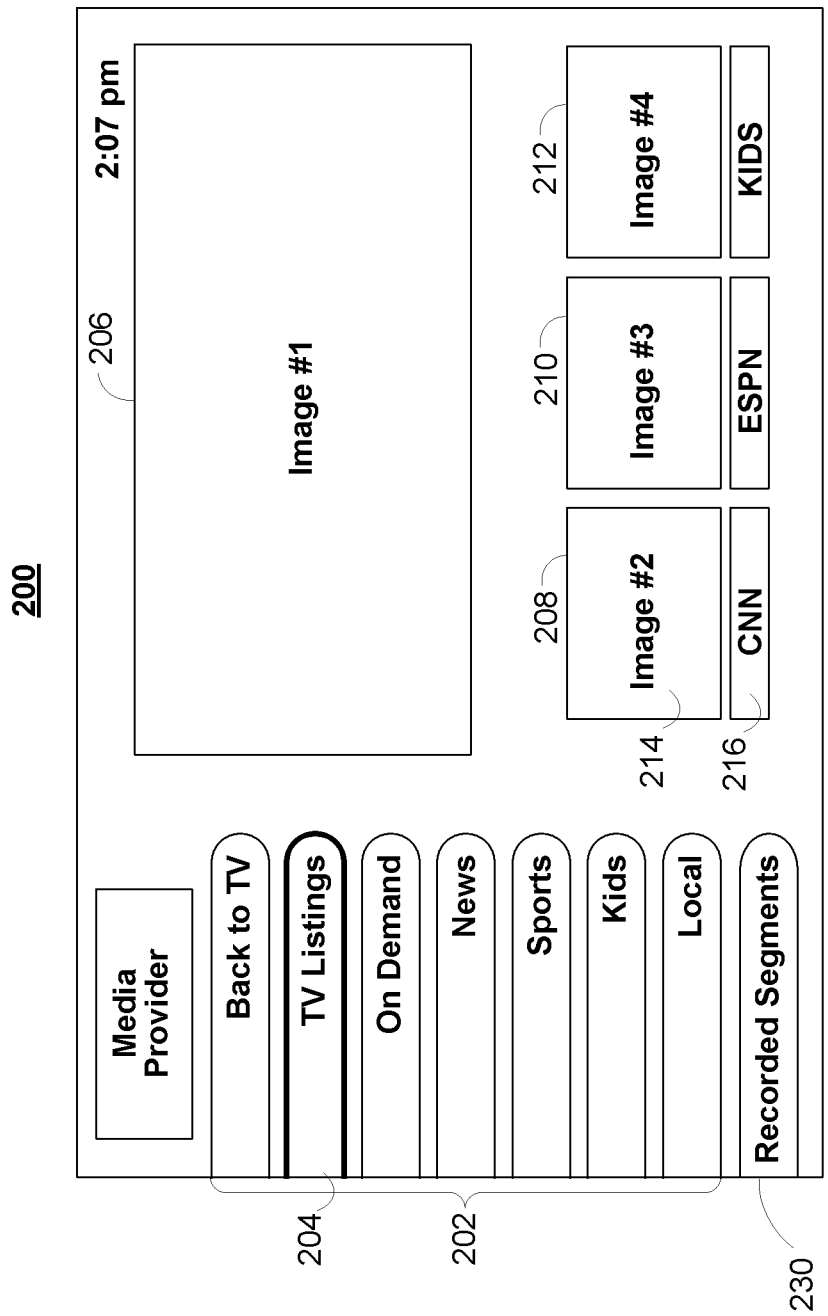

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as online applications (i.e., provided on a web-site), or as stand-alone applications or clients on hand-held computers, PDAs, mobile telephones, or other mobile devices. The various devices and platforms that may implement media guidance applications are described in more detail below.

Figure 1:
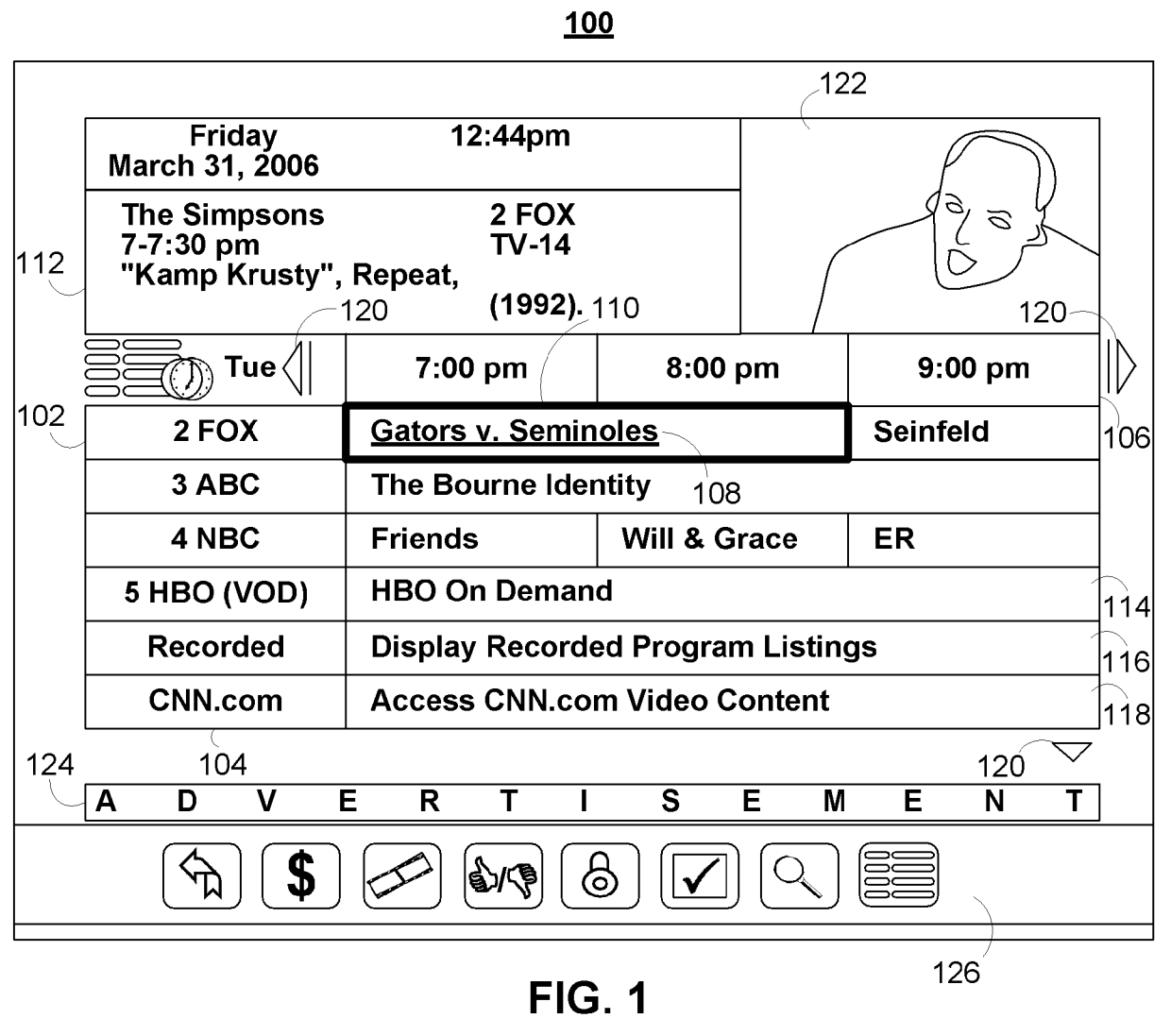

One of the functions of the media guidance application is to provide media listings and media information to users. FIGS. 1-2 show illustrative display screens that may be used to provide media guidance, and in particular media listings. The display screens shown in FIGS. 1-2, 5, 7 and 9 may be implemented on any suitable device or platform. While the displays of FIGS. 1-2, 5, 7 and 9 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

In some embodiments, the user may schedule a recording of a program by positioning highlight region 110 over a desired listing and pressing a suitable key on a remote control (e.g., record or select key). For example, the user may schedule a recording of the event "Gators v. Seminoles" which has a scheduled broadcast time of 7-9 PM. The media guidance application may determine that the event selected for recording will run over the scheduled broadcast time. For example, the media guidance application may monitor the event while the event is broadcast or provided and determine based on a variety of factors (e.g., a comparison of the time remaining in the event and the scheduled end time, information retrieved from a website indicating that the event is running longer than scheduled) that the event is running beyond the scheduled broadcast time (e.g., the event will end at about 8:15 PM).

In some implementations, the media guidance application may automatically extend the timeslot during which the event was scheduled for recording by a predetermined amount (e.g., 30 minutes or 1 hour). After the media guidance application completes recording the content provided by the program source during the extended timeslot, the media guidance application may trim the recorded content to remove or delete content that corresponds to a program that is not the event selected for recording. For example, the timeslot may originally be set to record the content provided by the program source during the scheduled broadcast time of 7-9 PM to record the event "Gators v. Seminoles." Upon determining that the event is running beyond the scheduled time, the media guidance application may extend the timeslot by 1 hour and record the content provided by the program source from 7-10 PM. However, the event may actually end at 9:15 PM which is 15 minutes beyond the scheduled broadcast time and accordingly additional content including an adjacent program may be included in the recorded segment of 7-10 PM.

The media guidance application may determine based on updated schedule information the actual end time of the event (e.g., 9:15 PM) (e.g., after recording the content during the extended timeslot or during the recording). After the content is recorded during the extended timeslot, the media guidance application may automatically (or upon receiving user instruction) trim the recorded segment to remove portions of the recorded segment that correspond to the program or content that was broadcast or provided by the program source between 9:15 PM-10 PM (e.g., the program Seinfeld). This way when the user plays back or accesses the recorded segment, the user is provided with access to only the selected event (e.g., Gators v. Seminoles) (e.g., the content that was provided by the program source between 7-9:15 PM) and no other content that was provided by the program source before or after the broadcast of the event. This eliminates the need for the user to fast forward through content that is recorded that was not selected by the user (e.g., the start or end of an adjacent program).

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179, 410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

A recorded segments option 230 may be included to allow the user to view a list of segments that have been recorded. In particular, selection of recorded segments option 230 may navigate the user to recorded program segments screen 900 (FIG. 9) discussed in detail below. Recorded segments screen 900 allows the user to playback and view segments that have been recorded. The user may also instruct the media guidance application to trim the recorded segments to remove extra content that was recorded (e.g., one or more portions of the recorded segment) as a result of the timeslot being extended due to a program or event running beyond a scheduled broadcast time.

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
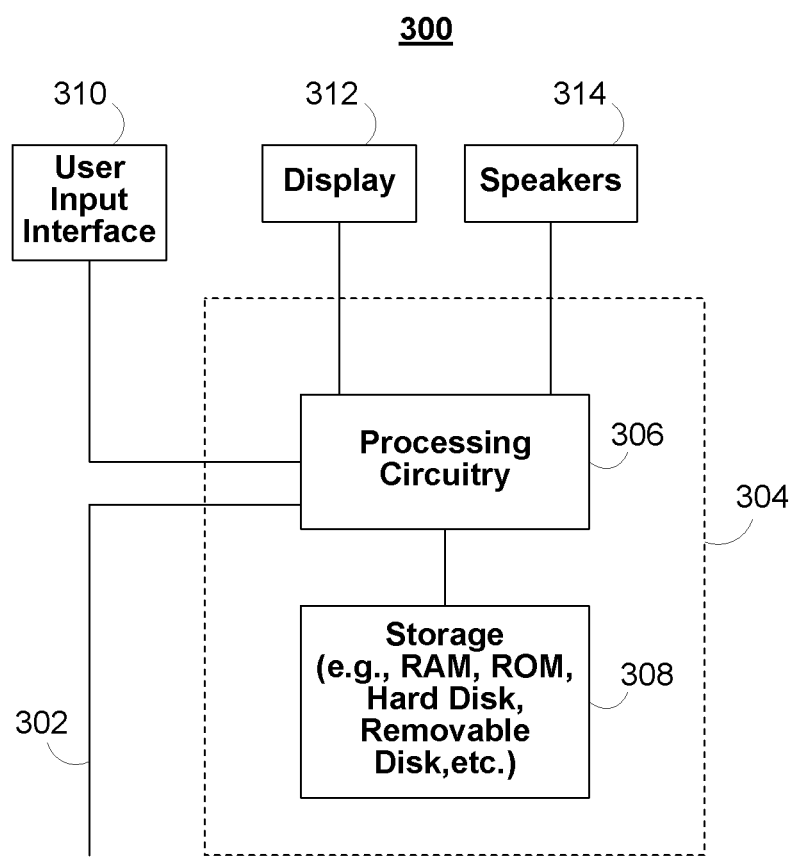
FIG. 3 shows an illustrative user equipment device in accordance with another embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

In some embodiments, control circuitry 304 may schedule one or more user selected programs that are provided by respective program sources for recording during a first timeslot. The program source may be any source of content distribution such as a television channel, a radio station, a real-time content provider, an Internet website, a web server, a telephone or cellular telephone distribution source, a 3G data source, a 4G data source, or any other similar source of programming. Control circuitry 304 may instruct a recording device (e.g., a DVR, a VCR, a memory card recorder, a hard disk drive, etc.) to store the content provided by the program source during the scheduled broadcast time (e.g., having a scheduled start time and a scheduled end time) of the program selected for recording.

Control circuitry 304 may monitor each program source from which programs are scheduled for recording to determine whether there is a change in the scheduled broadcast time of the one or more programs selected for recording. For example, control circuitry 304 may monitor a live broadcast of the program or process updated schedule information to determine whether the program selected for recording will run beyond the scheduled end time and/or will begin after the scheduled start time. In particular, control circuitry 304 may determine from the schedule information whether a live sporting event is provided by the same program source as the program source of the program scheduled recording. In addition, control circuitry 304 may determine whether the live sporting event is provided by the program source after the scheduled start time of the program scheduled for recording or that the live sporting event is the program scheduled for recording.

Figure 4:
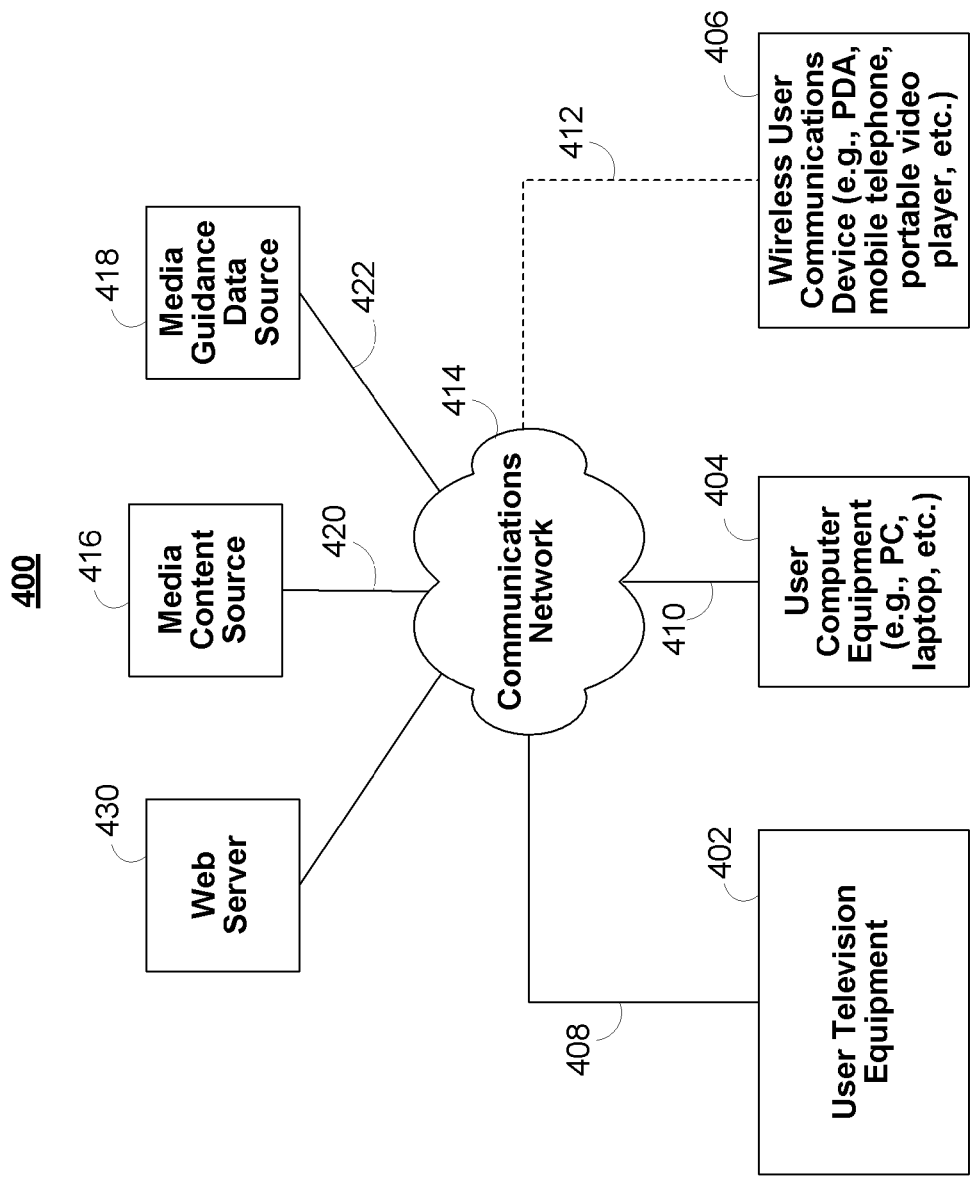
FIG. 4 is a diagram of an illustrative cross-platform interactive media system in accordance with another embodiment of the invention.

Control circuitry 304 may determine whether the live sporting event will run beyond the scheduled end time of the sporting event and after the scheduled start time of the program selected for recording. In some implementations, control circuitry 304 may determine that the live sporting event will run beyond the scheduled end time by receiving real-time updates from a real-time data source (e.g., a data feed from radio station, an Internet data source or website, or manual user input) such as web server 430 (FIG. 4). The real-time updates may indicate whether the sporting event is in overtime or has extra innings or for some other reason will run beyond the scheduled end time of the sporting event.

Control circuitry 304 may, as a result of the determination, reschedule the selected program for recording during a second timeslot. The second timeslot may be longer or larger in length of time than the first timeslot (e.g., the original timeslot in which the selected program was scheduled for recording). In particular, control circuitry 304 may extend the amount of time which the content provided by the program source is stored or recorded by a predetermined amount of time in order to ensure that the program selected for recording is fully captured. In some implementations, control circuitry 304 may automatically extend the recording time by 30 minutes or reschedule the selected program for recording in a second timeslot that is 30 minutes longer than the first timeslot. This ensures that if the sporting event runs beyond the scheduled end time of the sporting event by 30 minutes, the program that is selected for recording that follows the sporting event is fully captured even though recording of the selected program begins while the sporting event is ongoing.

In some implementations, control circuitry 304 may determine that the sporting event that is running beyond the scheduled end time of the sporting event is the program that is being recorded. Similarly, control circuitry 304 may reschedule the recording of the sporting event for recording during a second timeslot larger than the first time slot and more specifically automatically extend the recording end time of the sporting event by a predetermined amount of time, for example, 30 minutes. As a result of the rescheduling, the content recorded from the program source may encapsulate the program that was selected for recording and portions of one or more adjacent programs. This is because the second timeslot being larger than the first timeslot resulted in an overlap between a scheduled broadcast time of an adjacent program with the recording times corresponding to the second timeslot.

In particular, the second timeslot (e.g., the extended timeslot) may instruct the recording device to record content provided by the program source during a window of time of 9-10:30 PM where the program selected for recording is provided by the program source during the window of time of 9:15-10:15 PM. In this situation, the recorded content may encapsulate or include the content provided by the content source corresponding to a first program portion (e.g., the portion provided between 9-9:15 PM) and a second program portion (e.g., the portion provided between 10:15-10:30 PM). Control circuitry 304 may determine based on subsequently received scheduled information (e.g., updated schedule information received after the selected program was scheduled for recording during the first timeslot) that exact interval of time during which the program selected for recording was provided by the program source. In particular, control circuitry 304 may align the recorded content with the content actually provided by the program source. Control circuitry 304 may automatically trim the recorded content to remove the portions of the recorded content that correspond to programs that are adjacent to the program selected for recording. For example, control circuitry 304 may trim the recorded content to remove the portion of the recorded content corresponding to the first program portion provided between 9-9:15 PM and the recorded content corresponding to the second program portion provided between 10:15-10:30 PM. The trimmed recorded content includes or encapsulates only the content provided by the program source corresponding to the program selected for recording.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer)

and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

System 400 may include a web server 430 that may host a website. User equipment 402 may receive through communications network 414 updates (e.g., in real-time or during predefined time intervals) from one or more websites hosted by web server 430. The updates may be used by control circuitry 304 to determine whether a program on a given program source is running beyond a scheduled broadcast time. In some implementations, control circuitry 304 may query a website associated with a given event or program provided by a program source by issuing a communication to web server 430. In particular, control circuitry 304 may query the website associated with a given event or program to determine whether the event or program is running longer than expected and whether the event or program will run beyond the scheduled broadcast time of the event or program. Control circuitry 304 may use the information received from the website to adjust or reschedule a program for recording during a different (e.g., longer) timeslot so as to avoid missing recording content that will be delayed due to the event or program running beyond the scheduled broadcast time.

Control circuitry 304 may retrieve schedule update information from web server 430 after the content has finished recording to determine the actual end time of the program or event that ran beyond the scheduled broadcast time. Control circuitry 304 may trim the recorded content to remove portions of the recorded content that were received and recorded from the program source beyond the actual end time.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments, a user may schedule for recording a program provided by a program source during a first timeslot. The program may be a live sporting event (e.g., football) which typically runs beyond or over the scheduled broadcast time (e.g., 30 minutes over). Control circuitry 304 may determine that the program that is currently being recorded is running over and may extend the first timeslot to reschedule the program for recording during a longer second timeslot (FIG. 3). The amount of extension of the timeslot may be predetermined or user defined.

Figure 5:
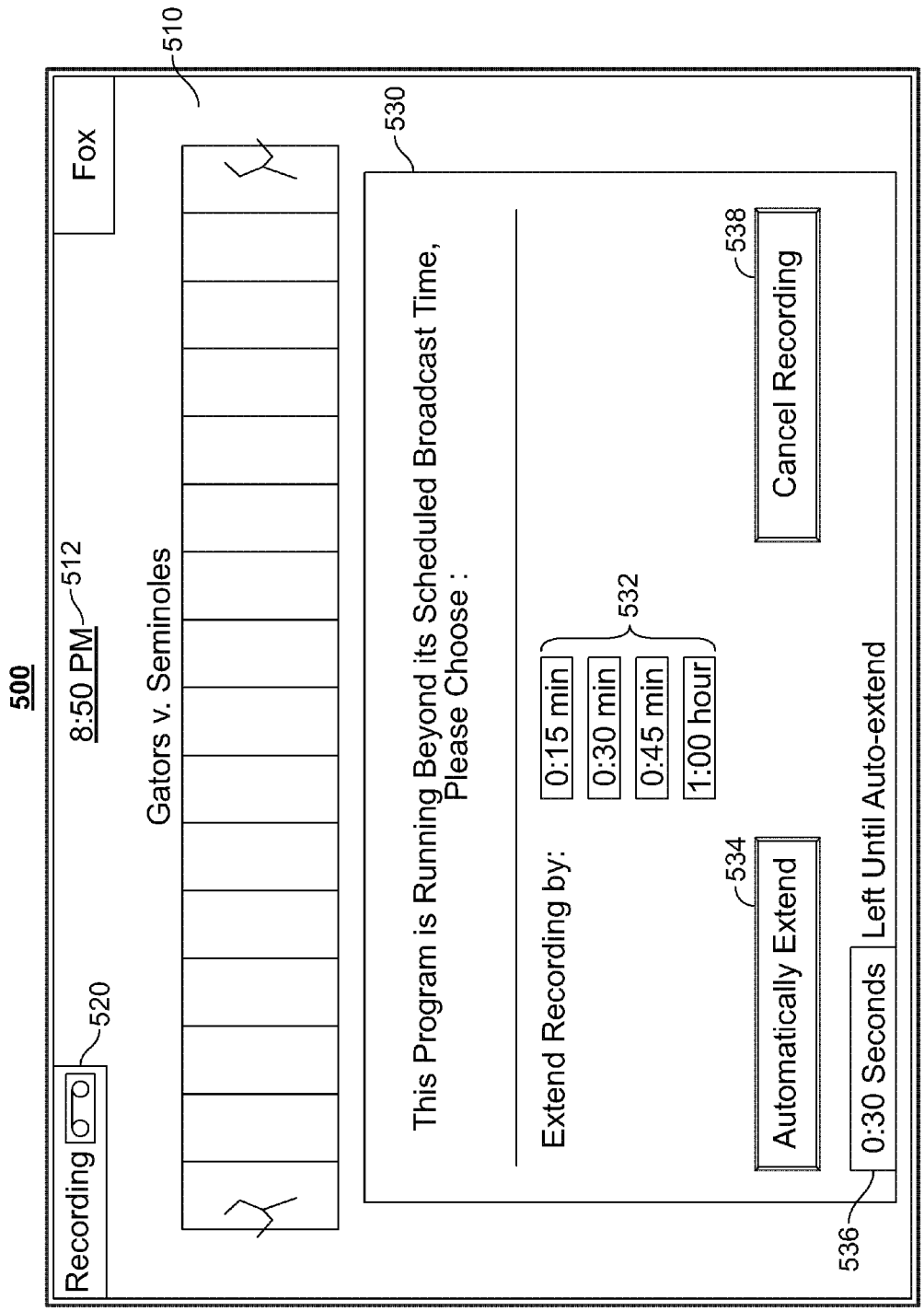
FIG. 5 shows an illustrative display for rescheduling a recording of a current program in accordance with an embodiment of the invention.

FIG. 5 shows an illustrative display 500 for rescheduling a recording of a current program in accordance with an embodiment of the invention. Screen 500 includes a video 510, the current time 512, a recording indicator 520 and a rescheduling prompt 530. Video 510 may be the content currently provided by the program source (e.g., FOX television channel). As discussed above, the program source may be any source of content distribution such as a television channel, a radio station, a real-time content provider, an Internet website, a web server, a telephone or cellular telephone distribution source, a 3G data source, a 4G data source, or any other similar source of programming.

Figure 6:
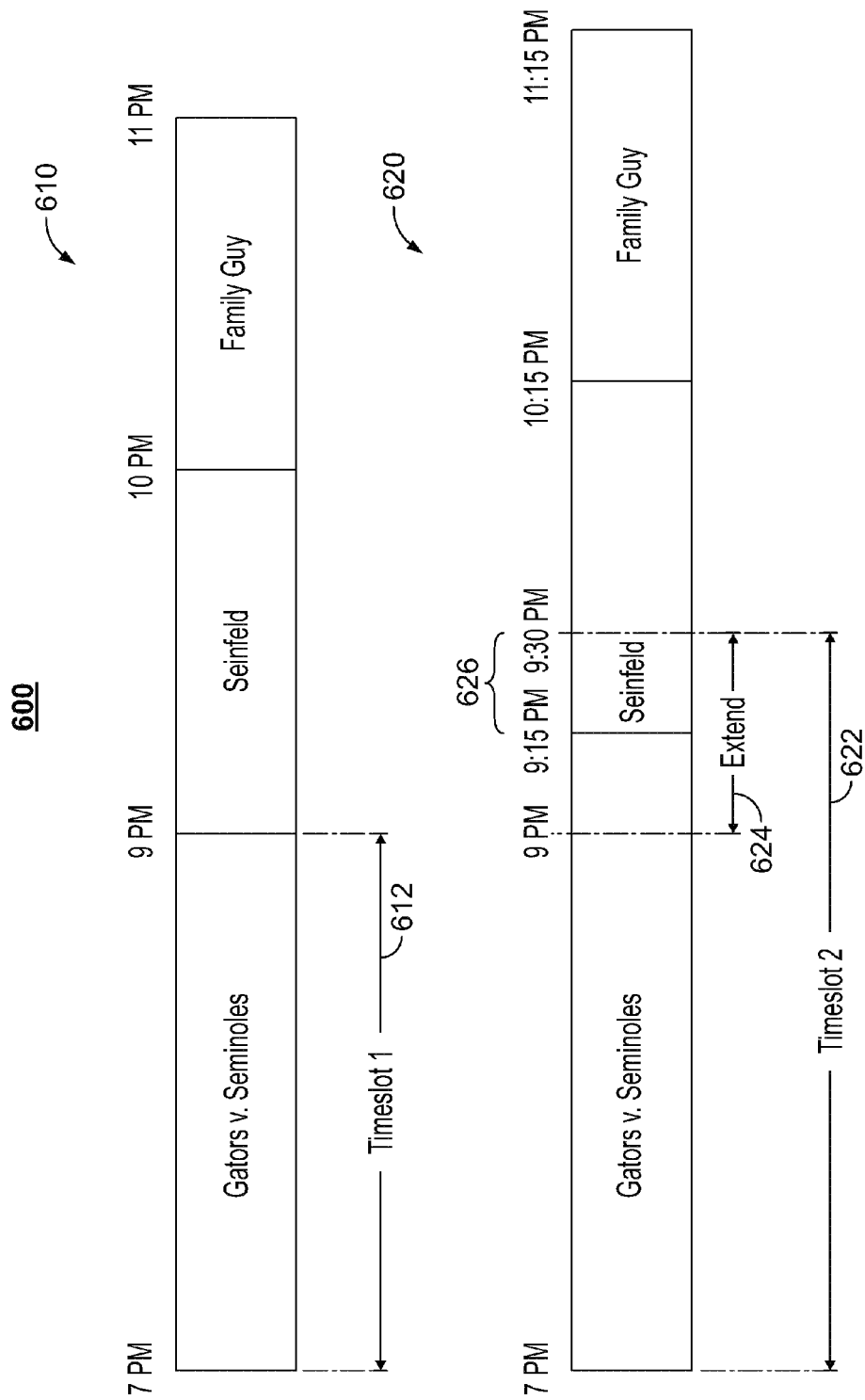
FIGS. 6 and 8 show graphical representations of rescheduling from a first timeslot into a second timeslot in accordance with an embodiment of the invention.

Video 510 may be a live sporting event (e.g., Gators v. Seminoles) that the user scheduled for recording during a first timeslot by selecting program listing 108 from grid 102 (FIG. 1). FIG. 6 shows a graphical representation 600 of a portion of the content 610 provided by the program source during a four hour time interval (e.g., 7 PM-11 PM). Graphical representation 600 includes a first timeslot 612 indicating that the content provided by the program source between the hours of 7-9 PM (e.g., corresponding to Gators v. Seminoles) is scheduled for recording.

Recording indicator 520 may be displayed on screen 500 to inform the user that video 510 has been selected for recording and is currently being recorded. At some point before the scheduled end of the broadcast of video 510 (e.g., 9 PM), control circuitry 304 may determine that the program will run beyond the scheduled end time. For example, control circuitry 304 may monitor a plurality of external sources (e.g., websites, radio stations, real-time data sources) for data corresponding to the program being recorded (e.g., Gators v. Seminoles). In particular, control circuitry 304 may analyze the data (e.g., using text-to-speech or analyzing the textual content) from the external sources to determine whether video 510 corresponds to a sporting event that is going into overtime or extra innings. In some implementations, control circuitry 304 may receive updated schedule information from media guidance data source 418 while the current program is being recorded but before the recording ends (FIG. 4). Control circuitry 304 may determine from the updated schedule information that the program being recorded has a new scheduled end time that is later than the original scheduled end time at which the first timeslot ends. Control circuitry 304 may determine that the program will run beyond the original scheduled broadcast time.

In some implementations, control circuitry 304 may also determine the current period, quarter or inning being played in the sporting event (program corresponding to video 510) to approximate how much time is remaining in the total game. Control circuitry 304 may compare the current time (e.g., 8:50 PM) with the total time remaining to determine whether the program corresponding to video 510 will end at the scheduled end time (e.g., 9 PM). In particular, when there is 40 minutes left in the sporting event, the current time is 8:50 PM and the program was originally scheduled to end at 9 PM, control circuitry 304 may determine that the program will run longer than the originally scheduled broadcast time by, for example, 30 minutes.

Upon detecting that the sporting event (i.e., program corresponding to video 510) is going into overtime or extra innings or will run beyond the originally scheduled broadcast time (discussed above), control circuitry 304 may generate for display prompt 530. Prompt 530 informs the user about the overtime or extra innings and provides the user with the opportunity to manually reschedule the program for recording during a longer second timeslot thereby extending the recording time. Alternatively, upon detecting that the sporting event (i.e., video 510) is going into overtime or extra innings, control circuitry 304 may automatically reschedule the currently broadcast program being recorded (e.g., Gators v. Seminoles) for recording during a second timeslot that is longer than the first timeslot instead of, or in addition to, displaying prompt 530.

Prompt 530 includes extension options 532, an automatically extend option 534, a cancel recording option 538 and a countdown timer 536. Extension options 532 allow the user to manually select by how much to extend the current recording timeslot. For example, when control circuitry 304 receives a user selection of extension option 532 corresponding to 30 minutes, control circuitry 304 may reschedule the program corresponding to video 510 for recording during a second timeslot that is longer than the first timeslot by 30 minutes. Graphical representation 600 shows a portion of the content 620 provided by the program source during a four hour time interval (e.g., 7 PM-11 PM) similar to portion of the content 610 (FIG. 6). Portion of the content 620 includes a second timeslot 622 which is the same as the first timeslot 612 extended by extension period 624 (e.g., 30 minutes). In particular, whereas first timeslot 612 corresponded to the recording of content provided by the program source between 7-9 PM, second timeslot 622 corresponds to the recording of content provided by the program source between 7-9:30 PM.

In some implementations, a portion 626 of second timeslot 622 overlaps with a portion of a second program that is adjacent to the program being recorded. This may occur when extension period 624 is large enough to cause the end time of second recording timeslot 622 to be later than a start time of a program that follows the program being recorded. In particular, the program being recorded (e.g., Gators v. Seminoles) may actually have ended at 9:15 PM but the extension period 624 was long enough to cause the recording of the program to end at 9:30 PM. Accordingly, the portion of the content provided by the program source between 9:15-9:30 PM (e.g., the beginning of the program Seinfeld) may be encapsulated or included in the recorded content corresponding to second timeslot 622.

Figure 10:
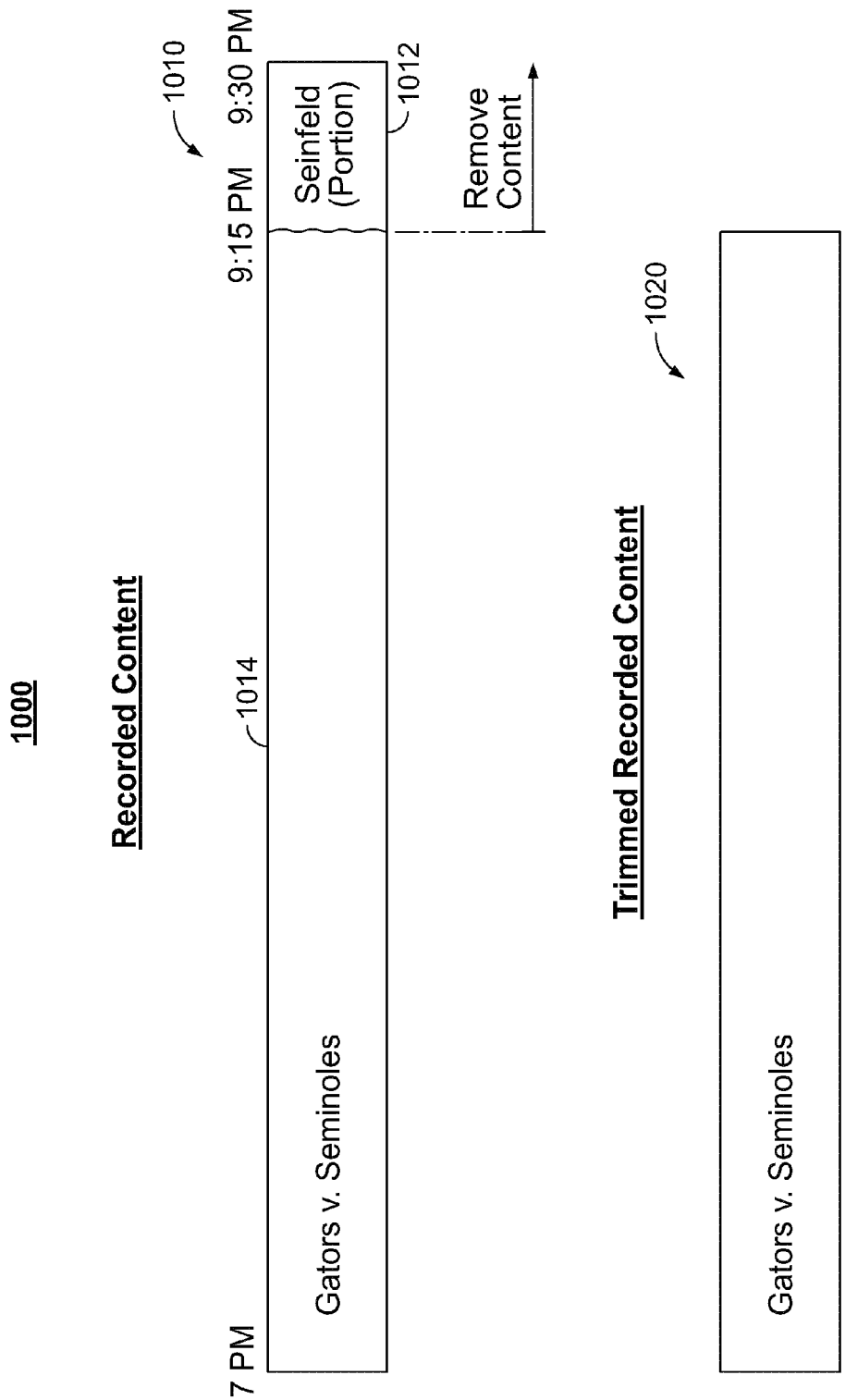
FIGS. 10 and 11 show graphical representations of recorded content trimming in accordance with an embodiment of the invention.
Figure 11:
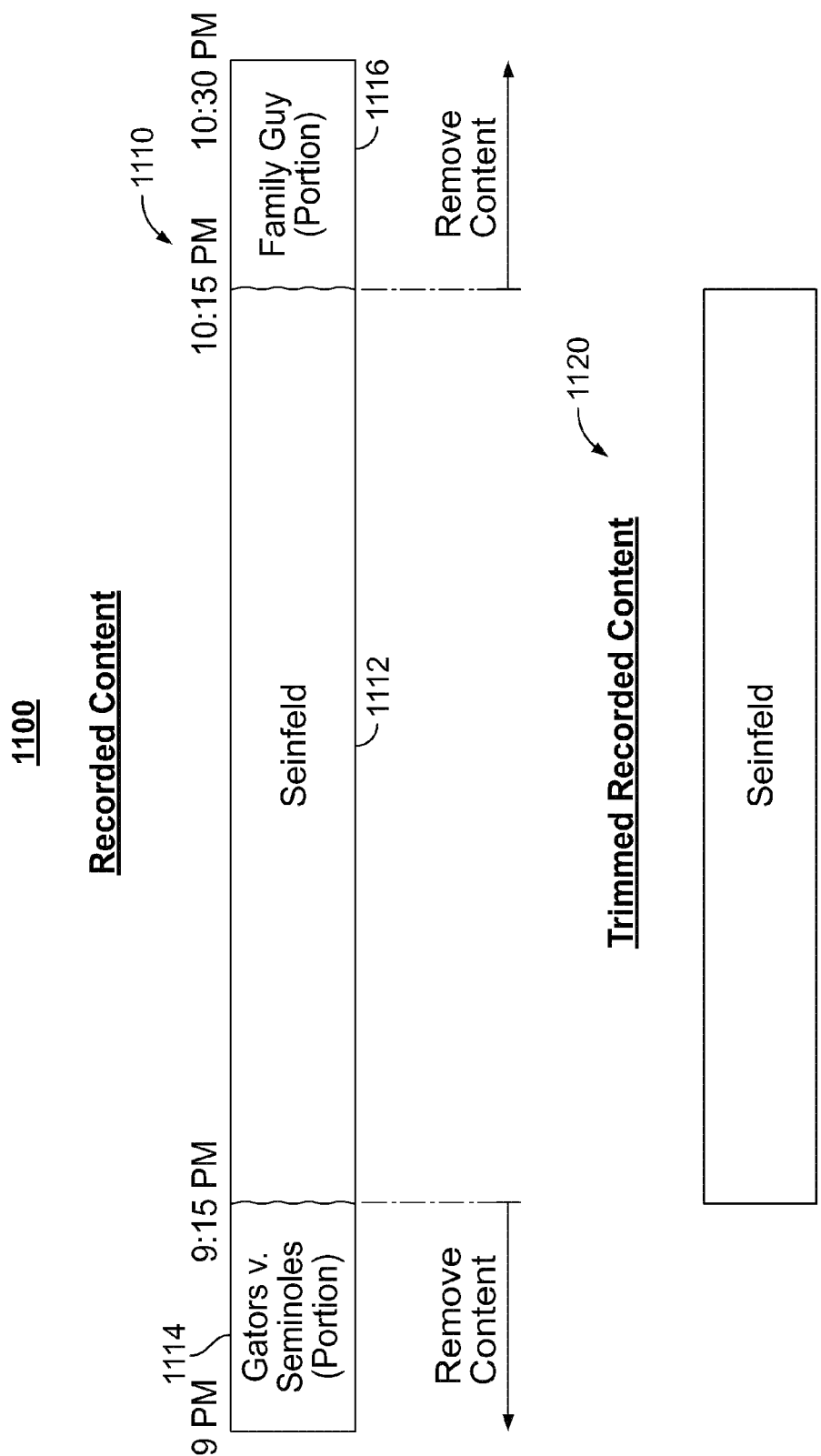

As discussed in detail below in connection with FIGS. 9-11, control circuitry 304 may trim the recorded content corresponding to second timeslot 622 to remove portion 626 of the recorded content that overlapped with the adjacent program (e.g., the portion of the recorded content corresponding to the second program, Seinfeld). In some embodiments, control circuitry 304 may receive actual broadcast schedule time information after recording the content from the program source. Control circuitry 304 may determine from the actual broadcast schedule information where the program selected for recording starts and ends and also the positions in time of adjacent programs that may be encapsulated or included in the recorded content. Control circuitry 304 may trim automatically the recorded content to remove portions of the recorded content that were not selected for recording based on the actual broadcast schedule information.

Referring back to FIG. 5, when control circuitry 304 receives a selection of automatically extend option 534, control circuitry 304 may automatically determine by how much to extend the first timeslot to reschedule the program for recording during a longer second timeslot. For example, control circuitry 304 may extend the first timeslot by one time period (e.g., 30 minutes) for one type of program and by a second time period (e.g., 1 hour) for a different type of program that is being recorded. Control circuitry 304 may cancel and delete the recorded content altogether upon receiving a user selection of cancel recording option 538. Countdown timer 536 may indicate to the user how much time is left before an automatic action takes place (e.g., automatically extend the timeslot). For example, the user may be provided with 30 seconds to extend the timeslot manually and otherwise automatically extend option 534 is selected automatically by default by control circuitry 304.

In some implementations, different types of programming may be assigned different amounts of predetermined extension times. For example, when a sporting event is scheduled for broadcast on the same program source before the user selected program for recording, control circuitry 304 may extend the recording time of the user selected program by 1 hour. However, when a reality television show is scheduled for broadcast on the same program source before the user selected program for recording, control circuitry 304 may extend the recording time of the user selected program by 30 minutes. Similarly, when a sporting event is the program selected for recording and control circuitry 304 determines that the program will run over, control circuitry 304 may automatically extend the timeslot to reschedule the program in a second timeslot that is 1 hour longer. Alternatively, when a reality television show is the program selected for recording and control circuitry 304 determines that the program will run over, control circuitry 304 may automatically extend the timeslot to reschedule the program in a second timeslot that is 30 minutes longer. Control circuitry 304 may determine whether to extend the timeslot based on the sporting event going over based on the type of sporting event. For example, for baseball games, control circuitry 304 may extend the timeslot by 30 minutes when the baseball game is determined to go over and for football games that go over, control circuitry 304 may extend the timeslot by 1 hour.

In some embodiments, a user may schedule for recording a program provided by a program source during a first timeslot. The program scheduled for recording may follow (either immediately adjacent or some later time in the future) a live sporting event (e.g., football) which typically runs beyond or over the scheduled broadcast time (e.g., 30 minutes over). Control circuitry 304 may determine that the live sporting event broadcast on the same program source (e.g., television channel) is running over (in the ways discussed above) and may extend the first timeslot to reschedule the program that follows for recording during a longer second timeslot (FIG. 3). The amount of extension of the timeslot may be predetermined or user defined.

Figure 7:
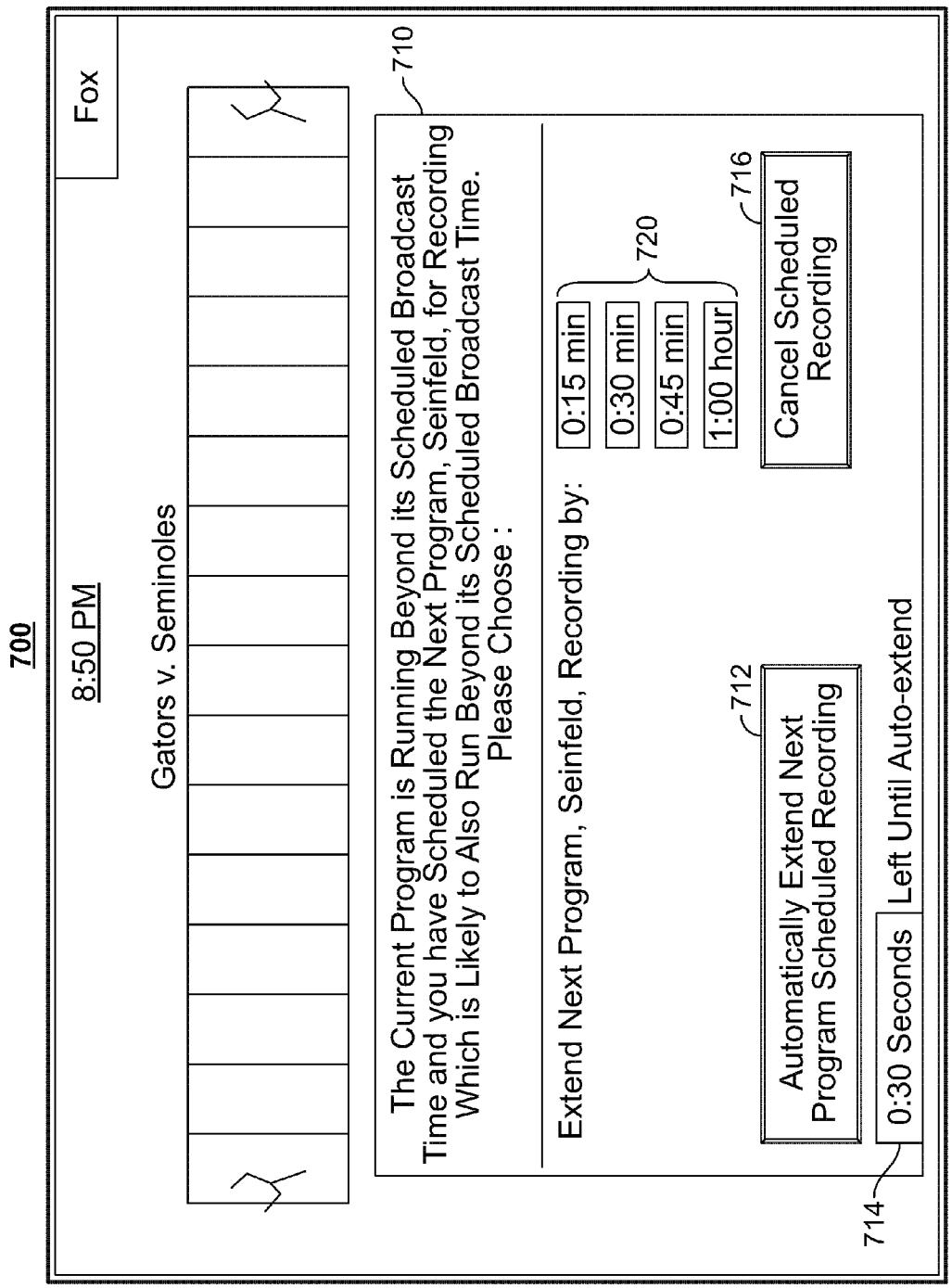
FIG. 7 shows an illustrative display for rescheduling a recording of a next program in accordance with an embodiment of the invention.

FIG. 7 shows an illustrative display 700 for rescheduling a recording of a program that follows a program that is running over a scheduled broadcast time in accordance with an embodiment of the invention. Screen 700 is similar to screen 500 (FIG. 5) except that prompt 710 is provided and the recording indicator is not displayed since the current program is not being recorded. In particular, display 700 illustrates the embodiment where the current program being provided on a program source impacts the start and end times of a subsequent program that was scheduled for recording on the same program source.

Figure 8:
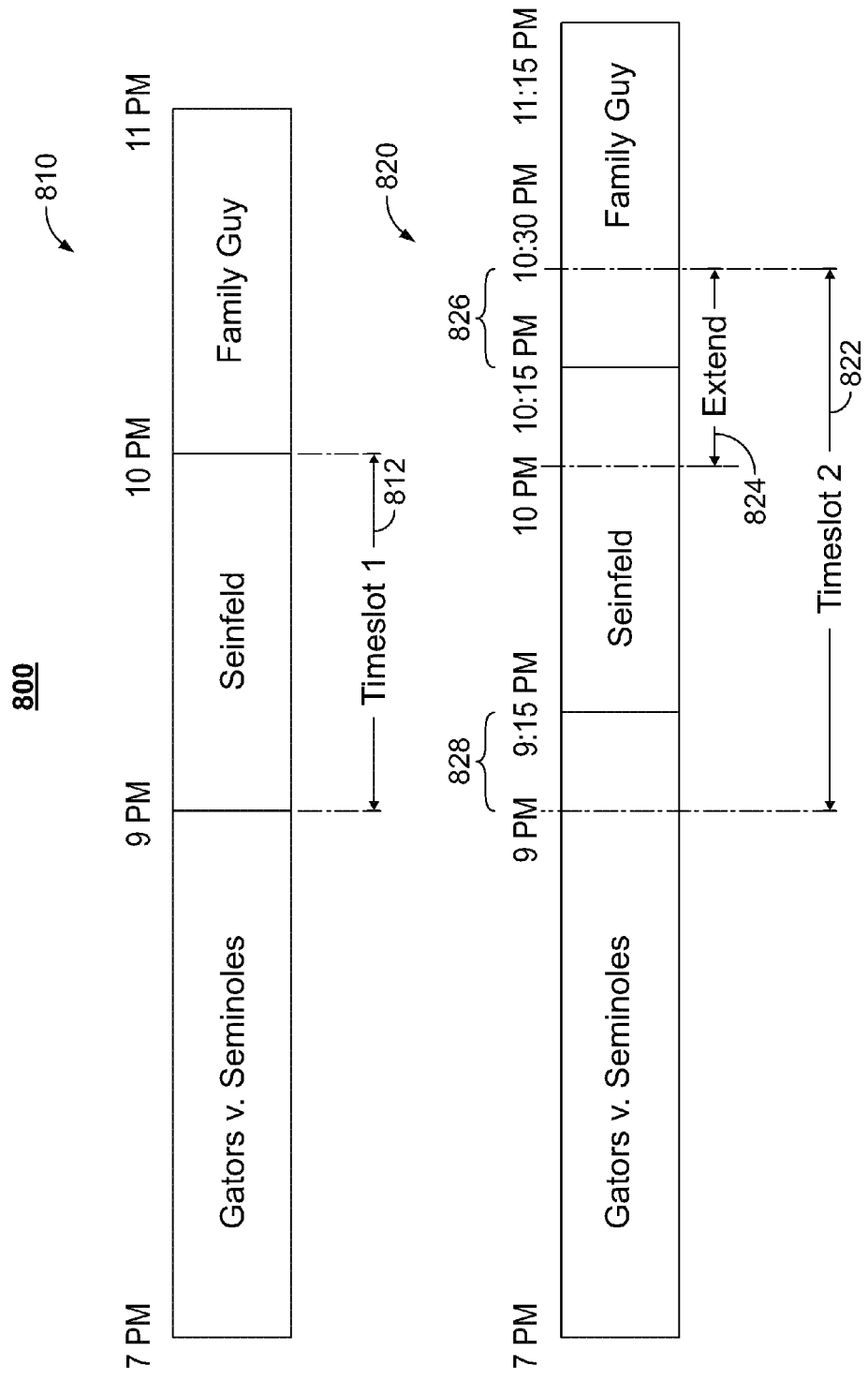

For example, the user may have scheduled for recording a program (e.g., Seinfeld) which follows the currently broadcast program (e.g., Gators v. Seminoles). FIG. 8 shows a graphical representation 800 of a portion of the content 810 provided by the program source during a four hour time interval (e.g., 7 PM-11 PM). Graphical representation 800 includes a first timeslot 812 indicating that the content provided by the program source between the hours of 9-10 PM (e.g., corresponding to Seinfeld) is scheduled for recording after the program, Gators v. Seminoles.

Control circuitry 304 may determine that the currently broadcast program (e.g., Gators v. Seminoles) is a sporting event that is running beyond the scheduled broadcast time. For example, as discussed above, control circuitry 304 may monitor the actual broadcast of the program or external sources (e.g., radio stations, websites, other data source) to determine whether the sporting event will run beyond the scheduled broadcast time. The manner in which control circuitry 304 determines whether a program (e.g., the currently broadcast program) is running beyond the scheduled broadcast time has been discussed in detail above in connection with FIGS. 5 and 6 and for the sake of brevity will not be repeated in connection with the discussion of FIGS. 7 and 8. It should be understood that the manner in which control circuitry 304 determines whether a program (e.g., the currently broadcast program) is running beyond the scheduled broadcast time may be similarly performed as that discussed in connection with FIGS. 5 and 6.

Upon determining that the currently broadcast program will run beyond the scheduled broadcast time, control circuitry 304 may determine whether there exist any scheduled recordings for timeslots that follow the currently broadcast program. When there is a scheduled recording during a timeslot that follows the currently broadcast program that is running beyond the scheduled broadcast time, control circuitry 304 may control circuitry 304 may generate for display prompt 710. Prompt 710 informs the user about the overtime or extra innings (e.g., that there exists a program that is running beyond its scheduled broadcast time) and provides the user with the opportunity to manually reschedule the program (e.g., Seinfeld) that follows for recording during a longer second timeslot thereby extending the recording time of the program (e.g., Seinfeld) scheduled for recording. Alternatively, upon detecting that the sporting event is going into overtime or extra innings, control circuitry 304 may automatically reschedule the program (e.g., Seinfeld) scheduled for recording during a first timeslot that follows the current program (e.g., Gators v. Seminoles) for recording during a second timeslot that is longer than the first timeslot instead of, or in addition to, displaying prompt 710.

Prompt 710 includes extension options 720, an automatically extend option 712, a cancel recording option 716 and a countdown timer 714. Prompt 710 may have the same or similar functionality as prompt 530 except that, unlike prompt 530, prompt 710 corresponds to extending the recording timeslot of a future program instead of the program currently provided by the program source (FIG. 5). Extension options 720 allow the user to manually select by how much to extend the recording timeslot of the future program scheduled for recording. For example, when control circuitry 304 receives a user selection of extension option 720 corresponding to 30 minutes, control circuitry 304 may reschedule the future program for recording during a second timeslot that is longer than the first timeslot by 30 minutes. In some implementations, control circuitry 304 may reschedule the future program for recording during a second timeslot that has a later end time than the first timeslot by a predetermined or user selected amount but that has the same start time as the first timeslot.

Graphical representation 800 shows a portion of the content 820 provided by the program source during a four hour time interval (e.g., 7 PM-11 PM) similar to portion of the content 810 (FIG. 8). Portion of the content 820 includes a second timeslot 822 which is the same as the first timeslot 812 extended by extension period 824 (e.g., 30 minutes). In particular, whereas first timeslot 812 corresponded to the recording of content provided by the program source between 9-10 PM (e.g., for recording Seinfeld), second timeslot 822 (e.g., the extended first timeslot) corresponds to the recording of content provided by the program source between 9-10:30 PM.

In some implementations, a first portion 826 of second timeslot 822 overlaps with a portion of a second program that is adjacent to the program being recorded. This may occur when extension period 824 is large enough to cause the end time of second recording timeslot 822 to be later than a start time of a program that follows the program being recorded. In particular, the program being recorded (e.g., Seinfeld) may actually have ended at 10:15 PM but the extension period 824 was long enough to cause the recording of the program to end at 10:30 PM. Accordingly, the portion of the content provided by the program source between 10:15-10:30 PM (e.g., the beginning of the program Family Guy) may be encapsulated or included in the recorded content corresponding to second timeslot 822.

In addition, a second portion 828 of second timeslot 822 overlaps with a portion of a third program that precedes the program being recorded. This may occur when the start time (e.g., 9 PM) of second timeslot 822 is the same as the start time of first timeslot 812 and the program preceding the program scheduled for recording ran over the scheduled broadcast time shifting the start time of the program scheduled for recording by a certain amount of time. In particular, the program being recorded (e.g., Seinfeld) may actually have started at 9:15 PM but was originally scheduled to start at 9 PM. Accordingly, the end portion of the program (e.g., the portion of Gators v. Seminoles that was provided between 9-9:15 PM) that preceded the program being recorded and that ran over by a certain amount of time (e.g., 15 minutes) may be encapsulated or included in the recorded content corresponding to second timeslot 822.

As discussed in detail below in connection with FIGS. 9-11, control circuitry 304 may trim the recorded content corresponding to second timeslot 822 to remove portions 828 and 826 of the recorded content that overlapped with the adjacent programs (e.g., the portion of the recorded content corresponding to the second program, Family Guy and the portion of the recorded content corresponding to the third program, Gators v. Seminoles). In some embodiments, control circuitry 304 may receive actual broadcast schedule time information after recording the content from the program source. Control circuitry 304 may determine from the actual broadcast schedule information where the program selected for recording starts and ends and also the positions in time of adjacent programs that may be encapsulated or included in the recorded content. Control circuitry 304 may trim automatically the recorded content to remove portions of the recorded content that were not selected for recording based on the actual broadcast schedule information.

Referring back to FIG. 7, when control circuitry 304 receives a selection of automatically extend option 712, control circuitry 304 may automatically determine by how much to extend the first timeslot to reschedule the program for recording during a longer second timeslot. For example, as discussed above, control circuitry 304 may extend the first timeslot by one time period (e.g., 30 minutes) for one type of program and by a second time period (e.g., 1 hour) for a different type of program that is being recorded. Control circuitry 304 may cancel the scheduled recording of the future program upon receiving a user selection of cancel recording option 716. Countdown timer 714 may indicate to the user how much time is left before an automatic action takes place (e.g., automatically extend the timeslot). For example, the user may be provided with 30 seconds to extend the timeslot manually and otherwise automatically extend option 712 is selected automatically by default by control circuitry 304.

In some embodiments, recorded segments may encapsulate or include content provided by a program source that corresponds to more than one program. In particular, when a timeslot is extended by a predetermined amount of time, content adjacent to a program selected for recording may be included in the recorded segment. The recorded segment may be trimmed to remove the extra content that was not originally selected by the user for recording. This provides the user with access to only the program that the user selected for recording even though there was a change in the broadcast schedule (e.g., due to a sporting event going into overtime or getting a rain delay) of a program provided on the same program source.

Figure 9:
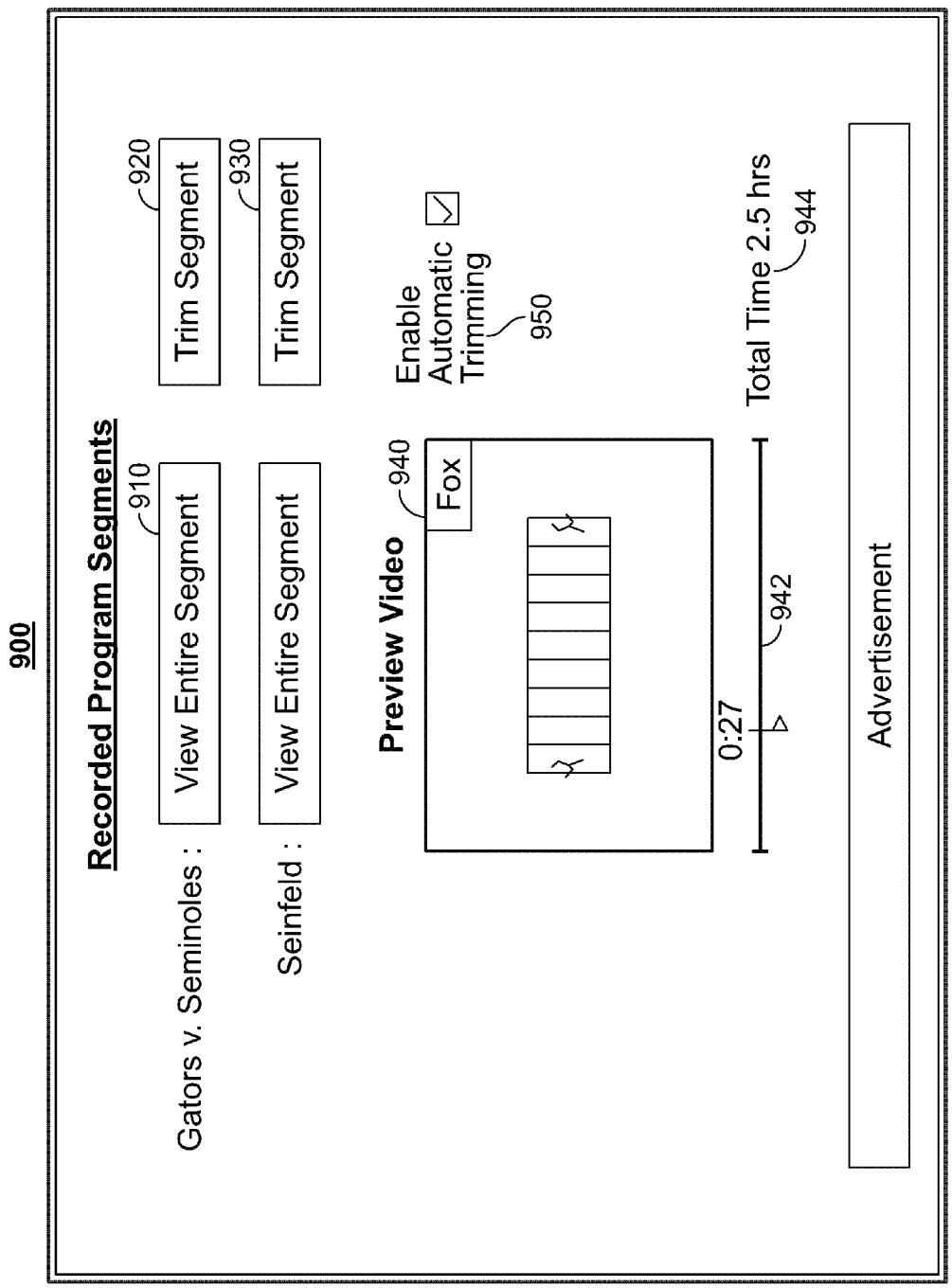
FIG. 9 shows an illustrative display of recorded program segment selection in accordance with an embodiment of the invention.

FIG. 9 shows an illustrative display 900 of recorded program segment selection in accordance with an embodiment of the invention. Display 900 includes recorded segment listings, a view entire segment option 910, trim segment options 920 and 930, a preview window 940 and an automatic trimming selection option 950. After a program segment is recorded, control circuitry 304 may include a listing 910 or link to the recorded segment for selection by the user in display 900. Each recorded segment listing may include an identifier (e.g., a program title, clip, image) of the program which the user selected for recording.

For example, after the program (e.g., Gators v. Seminoles) has been recorded during second timeslot 622, a listing that identifies the recorded segment may be included in display 900. Similarly, after the program (e.g., Seinfeld) has been recorded during second timeslot 822, a listing that identifies the recorded segment may also be included in display 900. Control circuitry 304 may receive a user selection of view entire segment option 910 and in response may display the recorded segment (e.g., the recorded segment before trimming) in preview window 940. In some implementations, control circuitry 304 may display the entire recorded segment in a full screen display and provide the user with an option to return to screen 900 by pressing an EXIT button.

When the user selects view entire segment option 910, the recorded segment including the portions of programs that are adjacent to the program selected for recording may be played back. For example, the program Gators v. Seminoles may have a runtime of 2.25 hours but because the program may have been extended by a predetermined amount of time of 30 minutes due to some unforeseen sporting event occurrence, a total of 2.5 hours were recorded to produce the recording segment. Accordingly, portions of an adjacent program are encapsulated in the recorded segment. Total playtime indicator 944 shows the total amount of time recorded in the recorded segment shown in preview window 940. The user may navigate transport bar 942 to view different playback times in the recorded segment. The user may also manually indicate to control circuitry 304 using preview window 940 which portions of the recorded segment to trim and remove.

Control circuitry 304 may receive a user selection of trim segment option 920. Trim segment option 920 may correspond to a recorded segment that corresponds to a timeslot that was extended during the recording of a program (e.g., live sporting event which ran over the scheduled broadcast time). In particular, trim segment option 920 may correspond to a recorded segment produced in the circumstances discussed in connection with FIGS. 5 and 6. FIG. 10 shows a graphical representation 1000 of recorded content trimming in accordance with an embodiment of the invention. Graphical representation 1000 shows a block of recorded content 1010 that is in storage that was provided by the program source during second timeslot 622 (FIG. 6). As shown, block of recorded content 1010 includes the content recorded during second timeslot 622 including the program selected for recording 1014 and a portion of an adjacent program 1012.

Control circuitry 304 may process the recorded segment corresponding to the program selected for recording (e.g., Gators v. Seminoles) to trim the recorded segment to remove portions of the recorded segment which were not originally selected for recording. For example, control circuitry 304 may receive updated program schedule information that includes schedule information for past programs. In particular, control circuitry 304 may request the updated program schedule information from an external source (e.g., a dedicated website on the Internet, media guidance data source 418, or some other suitable source). The updated program schedule information may include the actual broadcast times of the past programs including the programs scheduled for recording and the programs that are adjacent to the programs scheduled for recording.

Control circuitry 304 may compare the actual broadcast start and end times of the program scheduled for recording with the start and end times of the extended timeslot (e.g., second timeslot 622). Based on the comparison, control circuitry 304 may determine which portions of the recorded segment correspond to the program selected for recording (e.g. Gators v. Seminoles) and which portions correspond to portions of an adjacent program (e.g., Seinfeld). Control circuitry 304 may remove from storage all the portions of the recorded segment that correspond to a time period later than the actual end time of the program selected for recording (e.g., the time period 9:15-9:30 PM). Trimmed content 1020 shows a graphical representation of the content that is left in storage or that remains recorded after control circuitry 304 trims the recorded content to remove content that was not selected for recording. Control circuitry 304 may link the trimmed segment to a recorded program listing to provide the user with access that is exclusive of any program or content that was not selected by the user for recording (e.g., only provide access to Gators v. Seminoles). Control circuitry 304 may include an indicator (not shown) with each program listing in display 900 that indicates to the user that the recorded segment has been trimmed of content not selected for recording.

Control circuitry 304 may receive a user selection of trim segment option 930. Trim segment option 930 may correspond to a recorded segment that corresponds to an extended timeslot for a program that followed a program that ran over the scheduled broadcast time. In particular, trim segment option 930 may correspond to a recorded segment produced in the circumstances discussed in connection with FIGS. 7 and 8. FIG. 11 shows a graphical representation 1100 of recorded content trimming in accordance with an embodiment of the invention. Graphical representation 1100 shows a block of recorded content 1110 that is in storage that was provided by the program source during second timeslot 822 (FIG. 8). As shown, block of recorded content 1110 includes the content recorded during second timeslot 822 including the program selected for recording 1112, a portion of a first adjacent program 1114 and a portion of an second program 1116.

Control circuitry 304 may process the recorded segment corresponding to the program selected for recording (e.g., Seinfeld) to trim the recorded segment to remove portions of the recorded segment which were not originally selected for recording. For example, control circuitry 304 may receive updated program schedule information that includes schedule information for past programs. In particular, control circuitry 304 may request the updated program schedule information from an external source (e.g., a dedicated website on the Internet, media guidance data source 418, or some other suitable source). The updated program schedule information may include the actual broadcast times of the past programs including the programs scheduled for recording and the programs that are adjacent to the programs scheduled for recording.

Control circuitry 304 may compare the actual broadcast start and end times of the program scheduled for recording with the start and end times of the extended timeslot (e.g., second timeslot 822). Based on the comparison, control circuitry 304 may determine which portions of the recorded segment correspond to the program selected for recording (e.g., Seinfeld) and which portions correspond to portions of one or more adjacent programs (e.g., Gators v. Seminoles and Family Guy). Control circuitry 304 may remove from storage all the portions of the recorded segment that correspond to a time period later than the actual end time of the program selected for recording (e.g., the time period 10:15-10:30 PM). Control circuitry 304 may also remove from storage all the portions of the recorded segment that correspond to a time period earlier than the actual start time of the program selected for recording (e.g., the time period 9-9:15 PM). Trimmed recorded content 1120 shows a graphical representation of the content that is left in storage or that remains recorded after control circuitry 304 trims the recorded content to remove content that was not selected for recording. Control circuitry 304 may link the trimmed segment to a recorded program listing to provide the user with access that is exclusive of any program or content that was not selected by the user for recording (e.g., only provide access to Seinfeld).

Control circuitry 304 may receive a user selection of enable automatic trimming option 950. When enable automatic trimming option 950 is selected, control circuitry 304 may automatically trim each recorded segment to remove adjacent content that was not selected for recording after the segment is recorded during the second timeslot. Control circuitry 304 may wait until updated schedule data is received and/or may poll an external source after segment is recorded or during the recording of the segment to identify the actual start and end times of the program selected for recording. After control circuitry 304 receives the actual start and end times of the program selected for recording, control circuitry 304 may trim the recorded content automatically to remove content that was provided by the program source that was not selected for recording. Control circuitry 304 may include in display 900 an indicator (not shown) with each recorded segment listing indicating to the user that the recorded segment has been automatically trimmed.

In some implementations, control circuitry 304 may include an identified with each recorded segment of the source used to identify the actual start and end times of the program selected for recording. The user may add additional sources for control circuitry 304 to use to identify start and end times of programs. The user may also rank sources to indicate their relative reliability. Accordingly, when multiple sources of actual start and end times are available, control circuitry 304 may trim the recorded segments based on the source of actual start and end times with the highest rank as it may be the most reliable.

In some embodiments, some of the programs provided by the program source may include program data structures that may include a start time and/or an end time of the program. Control circuitry 304 may analyze the program data structure of one program to determine the start and/or end time of an adjacent program. For example, when a first program is known to have started at a time (e.g., 9:15 PM), control circuitry 304 may determine that a second program that is previous and adjacent to the first program ended at 9:15 PM. Accordingly, control circuitry 304 may identify 9:15 PM as the actual end time of the second program when necessary (e.g., to remove portions of the first program that are provided by the program source after 9:15 PM that are included in the second timeslot and the recorded segment).

Figure 12:
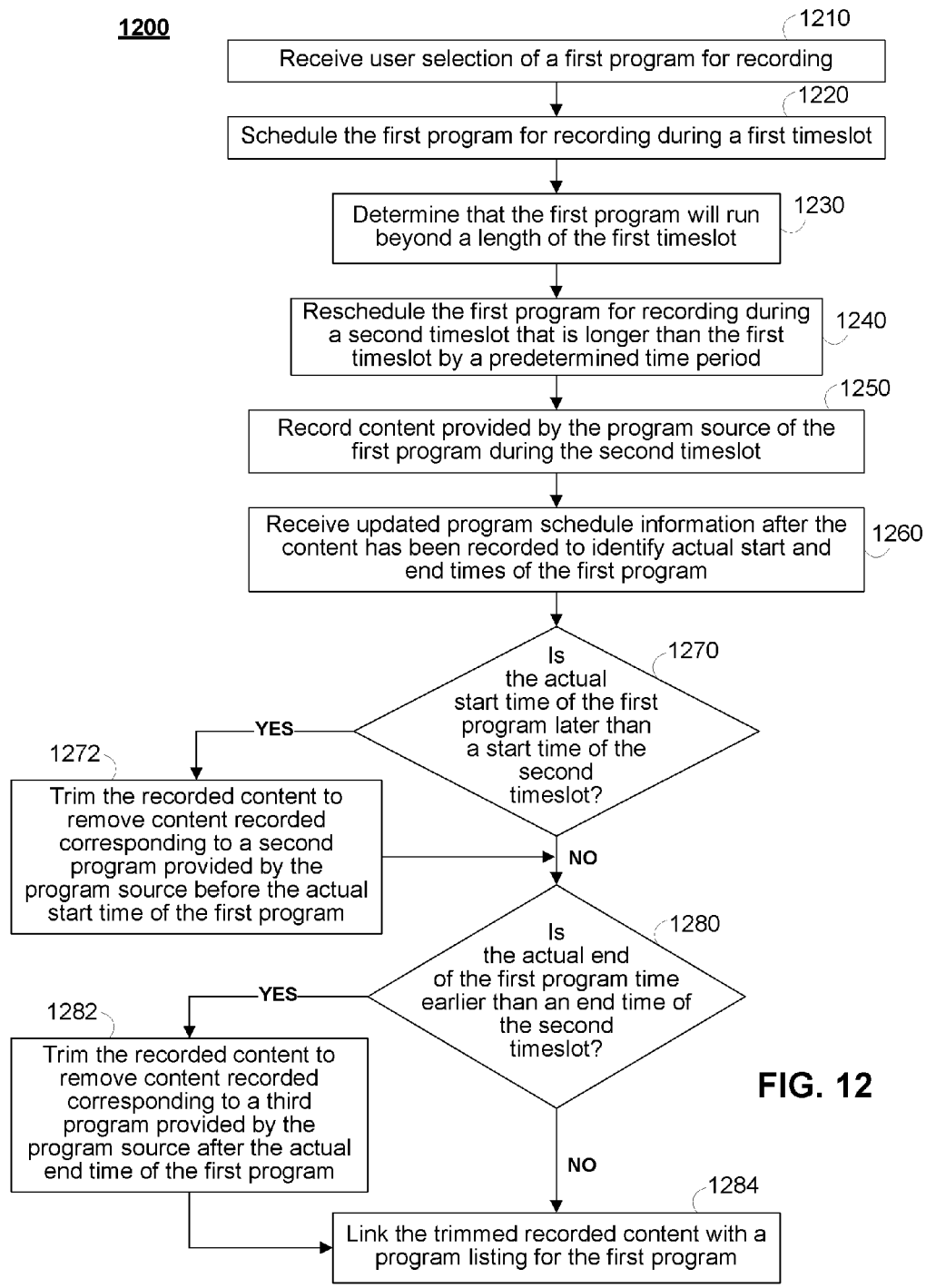
FIGS. 12 and 13 illustrate flow diagrams for trimming recorded content using a media guidance application in accordance with an embodiment of the invention.

FIG. 12 illustrates a flow diagram 1200 for trimming recorded content using a media guidance application in accordance with an embodiment of the invention. At step 1210, a user selection of a first program for recording is received. For example, a user may navigate highlight region 110 over a desired program listing 108 and press a suitable key on a remote control (e.g., SELECT key). In response, control circuitry 304 may provide the user with an option to schedule the program corresponding to the highlighted listing for recording (FIG. 1).

At step 1220, the first program is scheduled for recording during a first timeslot. For example, control circuitry 304 may schedule the selected program for recording during a first timeslot 612 or 812 (FIGS. 6 and 8). The first timeslot may be an interval of time corresponding to the scheduled broadcast time of the selected program (e.g., 7-9 PM or 9-10 PM).

At step 1230, a determination is made that the first program will run beyond a length of the first timeslot. For example, control circuitry 304 may receive data (e.g., schedule information or sporting event time/scoring information) from a plurality of external sources to determine whether the program currently being broadcast on the program source will run over (e.g., because of an overtime or extra innings in a sporting event). Alternatively, control circuitry 304 may monitor the program being broadcast by the program source to determine whether the program will end at the scheduled end time or will go beyond the scheduled end time. When the first program is a program that follows the program that is running beyond the scheduled broadcast time, control circuitry 304 may determine that the program will run beyond a length of the first timeslot (e.g., because the first program will begin later than anticipated and end later than anticipated). In particular, the first program that follows the program that ran beyond the scheduled broadcast time will end after the end time of the first timeslot and thereby will run beyond the length of the first timeslot.

At step 1240, the first program is rescheduled for recording during a second timeslot that is longer than the first timeslot by a predetermined time period. For example, control circuitry 304 may add a predetermined time period (e.g., 30 minutes) to the first timeslot to extend the recording period of the first program. In particular, second timeslot 622 may be greater than first timeslot 612 by 30 minutes and may run from 7-9:30 PM (FIG. 6). Similarly, second timeslot 822 may be greater than first timeslot 812 by 30 minutes and may run from 9-10:30 PM (FIG. 8).

At step 1250, content provided by the program source of the first program is recorded during the second timeslot. For example, storage 308 may include a hard disk or a videotape recording device or some other suitable media recording device that records content provided by a program source during a certain time interval (e.g., the second timeslot) (FIG. 3).

At step 1260, updated program schedule information is received after the content has been recorded to identify actual start and end times of the first program. For example, control circuitry 304 may receive schedule information for past programs from media guidance data source 418 or some other source (e.g., a website on the Internet). From the schedule information, control circuitry 304 may identify the actual start and end times of the first program that was selected for recording. The actual start and end times may be different from the start and end times anticipated when the program was selected for recording due to programs running beyond their scheduled broadcast times.

At step 1270, a determination is made as to whether the actual start time of the first program is later than a start time of the second timeslot. When it is determined that the actual start time is later than the start time of the second timeslot, the process proceeds to step 1272, otherwise the process proceeds to step 1280.

At step 1272, the recorded content is trimmed to remove content recorded corresponding to a second program provided by the program source before the actual start time of the first program. For example, portion of first adjacent program 1114 may be removed as that portion was broadcast before the actual start time (e.g., 9:15 PM) of the first program 1112 (e.g., Seinfeld) (FIG. 11).

At step 1270, a determination is made as to whether the actual end time of the first program is earlier than an end time of the second timeslot. When it is determined that the actual end time is earlier than the end time of the second timeslot, the process proceeds to step 1282, otherwise the process proceeds to step 1284.

At step 1282, the recorded content is trimmed to remove content recorded corresponding to a third program provided by the program source after the actual end time of the first program. For example, portion of second adjacent program 1116 may be removed as that portion was broadcast after the actual end time (e.g., 10:15 PM) of the first program 1112 (e.g., Seinfeld) (FIG. 11). Similarly, portion of second adjacent program 1012 may be removed as that portion was broadcast after the actual end time (e.g., 9:15 PM) of the first program 1114 (e.g., Seinfeld) (FIG. 10).

At step 1284, the trimmed content is linked with a program listing for the first program. For example, the user may select the program listing to playback or access the trimmed recorded content and gain exclusive access to only the content recorded from the program source that corresponds to the first program that the user selected for recording.

Figure 13:
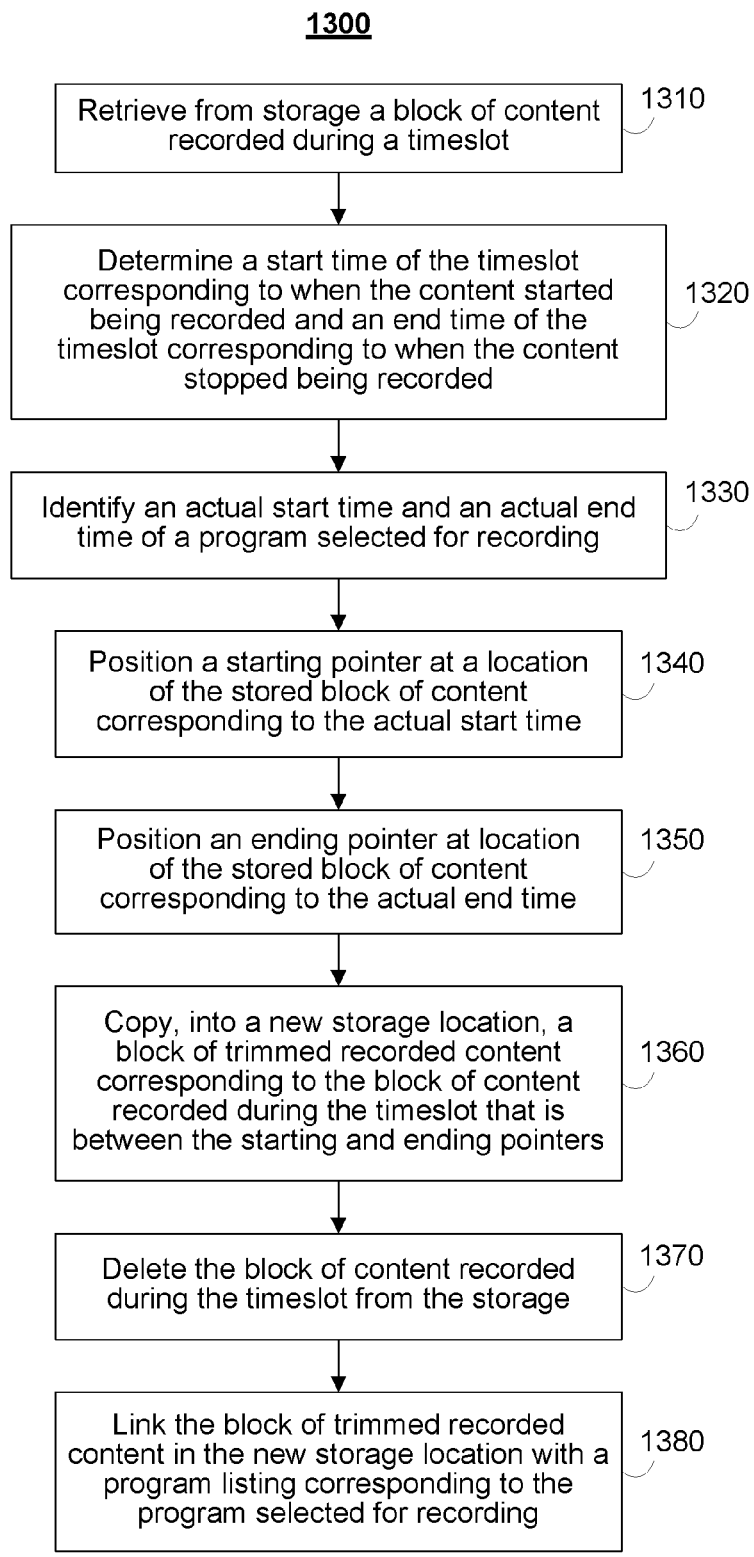

FIG. 13 illustrates a flow diagram 1300 for trimming recorded content using a media guidance application in accordance with an embodiment of the invention. At step 1310, a block of content recorded during a timeslot is retrieved from storage. For example, control circuitry 304 may retrieve from storage block of recorded content 1110 that includes content recorded during timeslot 822 (FIGS. 8 and 11).

At step 1320, a start time of the timeslot corresponding to when the content started being recorded and an end time of the timeslot corresponding to when the content stopped being recorded are determined. For example, control circuitry 304 may determine that the start time of the timeslot is the originally scheduled start time (e.g., 9 PM) and that the end time of the timeslot which was originally 10 PM was extended by, for example, 30 minutes making the end time of the timeslot 10:30 PM.

At step 1330, an actual start time and an actual end time of the program selected for recording are identified. For example, control circuitry 304 may receive schedule information for past programs from media guidance data source 418 or some other source (e.g., a website on the Internet). From the schedule information, control circuitry 304 may identify the actual start and end times of the program that was selected for recording. The actual start and end times may be different from the start and end times anticipated when the program was selected for recording due to programs running beyond their scheduled broadcast times.

At step 1340, a starting pointer is positioned at a location of the stored block of content corresponding to the actual start time. For example, control circuitry 304 may position the starting pointer at the memory address of where the start of the content recorded during the timeslot is stored when the actual start time matches the start time of the timeslot. In some implementations, control circuitry 304 may position the starting pointer at the memory address of where the portion of the content recorded corresponds to the actual start time (e.g., 9:15 PM) which may be later than the position in memory corresponding to where the content started being recorded (e.g., 9 PM).

At step 1350, an ending pointer is positioned at a location of the stored block of content corresponding to the actual end time. For example, control circuitry 304 may position the ending pointer at the memory address of where the portion of the content recorded corresponds to the actual end time (e.g., 10:15 PM) which may be earlier than the position in memory corresponding to where the content stopped being recorded (e.g., 10:15 PM).

At step 1360, a block of trimmed recorded content corresponding to the block of content recorded during the timeslot that is between the starting and ending pointers is copied into a new storage location.

At step 1370, the block of content recorded during the timeslot is deleted from the storage.

At step 1380, the block of trimmed recorded content in the new storage location is linked with a program listing corresponding to the program selected for recording. For example, the user may select the program listing to playback or access the trimmed recorded content that is in the new storage location and gain exclusive access to only the content recorded from the program source that corresponds to the program that the user selected for recording.

It should be understood that the above steps of the flow diagram of FIGS. 12 and 13 may be executed or performed in any order or sequence not limited to the order and sequence shown and described in the figure. Also, some of the above steps of the flow diagram of FIGS. 12 and 13 may be executed or performed substantially simultaneously where appropriate or in parallel to reduce latency and processing times.

The above described embodiments of the present disclosure are presented for purposes of illustration and not of limitation, and the present disclosure is limited only by the claims which follow.

What is claimed is:

1. A method for recording a scheduled broadcast program on a media equipment device, the method comprising:
scheduling for recording, during a timeslot, a first program provided by a program source, wherein a second program is provided by the program source outside of the timeslot;
automatically determining, before transmission of the first program begins, that the first program will run beyond a length of the timeslot;
extending, based on the determining, the recording of the first program to record the first program during an extended timeslot, wherein the extended timeslot is longer than the timeslot, and wherein a portion of the extended timeslot overlaps with a scheduled time period of the second program, wherein extending the recording causes a portion of the second program, which has not been scheduled for recording and is outside of the timeslot, to be recorded during the extended timeslot, wherein the timeslot has a first end time and the extended timeslot has a second end time that is later than the first end time by an amount, wherein each of the timeslot and extended timeslot have a same start time, and wherein the first program ends before the second end time;
recording content provided by the program source during the extended timeslot such that the first program and the portion of the second program are recorded; and
automatically trimming the recorded content to remove a first portion of the recorded content corresponding to the portion of the second program.

2. The method of claim 1, wherein determining that the first program will run beyond the length of the timeslot comprises:
receiving updated program schedule information; and
determining, based on the updated program schedule information, that a scheduled time period of the first program has changed after the first program was scheduled for recording during the timeslot.

3. The method of claim 1 wherein:
determining that the first program will run beyond a length of the timeslot comprises:
monitoring the second program that is broadcast by the program source before the first program; and
determining that the second program is running beyond an end time of the scheduled time period of the second program; and
the first portion that is removed corresponds to the recorded content between a start time and an end time of the timeslot.

4. The method of claim 1 wherein:
determining that the first program will run beyond a length of the timeslot comprises:
monitoring a third program that is broadcast by the program source before the first and second programs; and
determining that the third program is running beyond a start time of the timeslot; and
the first portion that is removed corresponds to the recorded content between an end time of the timeslot and an end time of the extended timeslot.

5. The method of claim 4, wherein another portion of the extended timeslot overlaps with a scheduled time period of the third program, further comprising:
automatically trimming the recorded content to remove a second portion of the recorded content corresponding to the third program.

6. The method of claim 1 further comprising:
after the recording, determining that the extended timeslot overlaps with the scheduled time period of the second program; and
automatically trimming the first portion based on determining that the extended timeslot overlaps with the scheduled time period.

7. The method of claim 6, wherein determining that the extended timeslot overlaps with the scheduled time period of the second program comprises:
receiving updated program schedule information;
identifying a start time of the second program from the updated program schedule information; and
determining that the start time of the second program precedes an end time of the extended timeslot.

8. The method of claim 1, wherein automatically trimming the recorded content to remove a first portion comprises:
identifying a start time and an end time of the first program based on program schedule information;
removing portions of the recorded content that are provided before the start time and that are provided after the end time of the first program; and
associating a program listing of the first program with the trimmed recorded content.

9. The method of claim 1, wherein the program source is a television channel, an IP address, a website, or a streaming video content source.

10. A system for recording a scheduled broadcast program on a media equipment device, the system comprising:
a storage device; and control circuitry configured to:
schedule for recording, during a timeslot, a first program provided by a program source, wherein a second program is provided by the program source outside of the timeslot;
automatically determine, before transmission of the first program begins, that the first program will run beyond a length of the timeslot;
extend, based on the determining, the recording of the first program to record the first program during an extended timeslot, wherein the extended timeslot is longer than the timeslot, and wherein a portion of the extended timeslot overlaps with a scheduled time period of the second program, wherein extending the recording causes a portion of the second program, which has not been scheduled for recording and is outside of the timeslot, to be recorded during the extended timeslot, wherein the timeslot has a first end time and the extended timeslot has a second end time that is later than the first end time by an amount, wherein each of the timeslot and extended timeslot have a same start time, and wherein the first program ends before the second end time;
record, on the storage device, content provided by the program source during the extended timeslot such that the first program and the portion of the second program are recorded; and
automatically trim the recorded content to remove a first portion of the recorded content corresponding to the portion of the second program.

11. The system of claim 10, wherein the control circuitry is further configured to:
receive updated program schedule information; and
determine, based on the updated program schedule information, that a scheduled time period of the first program has changed after the first program was scheduled for recording during the timeslot.

12. The system of claim 10 wherein:
the control circuitry is further configured to:
monitor the second program that is broadcast by the program source before the first program; and
determine that the second program is running beyond an end time of the scheduled time period of the second program; and
the first portion that is removed corresponds to the recorded content between a start time and an end time of the timeslot.

13. The system of claim 10 wherein:
the control circuitry is further configured to:
monitor a third program that is broadcast by the program source before the first and second programs; and
determine that the third program is running beyond a start time of the timeslot; and
the first portion that is removed corresponds to the recorded content between an end time of the timeslot and an end time of the extended timeslot.

14. The system of claim 13, wherein another portion of the extended timeslot overlaps with a scheduled time period of the third program, and wherein the control circuitry is further configured to:
automatically trim the recorded content to remove a second portion of the recorded content corresponding to the third program.

15. The system of claim 10, wherein the control circuitry is further configured to:
after the recording, determine that the extended timeslot overlaps with the scheduled time period of the second program; and
automatically trim the first portion based on determining that the extended timeslot overlaps with the scheduled time period.

16. The system of claim 15, wherein the control circuitry is further configured to:
receive updated program schedule information;
identify a start time of the second program from the updated program schedule information; and
determine that the start time of the second program precedes an end time of the extended timeslot.

17. The system of claim 10, wherein the control circuitry is further configured to:
identify a start time and an end time of the first program based on program schedule information;
remove portions of the recorded content that are provided before the start time and that are provided after the end time of the first program; and
associate a program listing of the first program with the trimmed recorded content.

18. The system of claim 10, wherein the program source is a television channel, an IP address, a website, or a streaming video content source.

* * * * *